(12) United States Patent
Sanford et al.

(10) Patent No.: US 9,941,570 B2
(45) Date of Patent: Apr. 10, 2018

(54) COMPACT RADIO FREQUENCY ANTENNA APPARATUSES

(71) Applicant: Ubiquiti Networks, Inc., New York, NY (US)

(72) Inventors: John R. Sanford, Escondido, CA (US); Jude Lee, San Jose, CA (US); Yanwei Sun, San Marcos, CA (US)

(73) Assignee: Ubiquiti Networks, Inc., New York, NY (US)

( * ) Notice: Subject to any disclaimer, the term of this patent is extended or adjusted under 35 U.S.C. 154(b) by 0 days.

(21) Appl. No.: 14/676,641

(22) Filed: Apr. 1, 2015

(65) Prior Publication Data

US 2015/0280329 A1    Oct. 1, 2015

Related U.S. Application Data

(60) Provisional application No. 61/973,750, filed on Apr. 1, 2014, provisional application No. 61/978,755, filed
(Continued)

(51) Int. Cl.
*H01Q 1/06* (2006.01)
*H01Q 21/24* (2006.01)
(Continued)

(52) U.S. Cl.
CPC ............... *H01Q 1/06* (2013.01); *H01Q 1/405* (2013.01); *H01Q 13/02* (2013.01); *H01Q 19/19* (2013.01);
(Continued)

(58) Field of Classification Search
CPC ............. H01Q 9/0428; H01Q 13/0241; H01Q 19/134; H01Q 19/193
See application file for complete search history.

(56) References Cited

U.S. PATENT DOCUMENTS

| 2,455,888 A | 12/1948 | Brown |
| 3,155,975 A | 11/1964 | Chatelain |
(Continued)

FOREIGN PATENT DOCUMENTS

| CN | 202042599 U | 11/2011 |
| GB | 2313957 A | 12/1997 |
(Continued)

OTHER PUBLICATIONS

Schulz et al.; U.S. Appl. No. 15/289,031 entitled "Radio system for long-range high-speed wireless communication," filed Oct. 7, 2016.
(Continued)

*Primary Examiner* — Daniel J Munoz
(74) *Attorney, Agent, or Firm* — Shay Glenn LLP

(57) ABSTRACT

Antenna assemblies are described herein. In particular, described herein are multi-focal-point antenna devices and compact radio frequency (RF) antenna devices. Any of these assemblies may include a primary feed that includes a single patterned emitting surface from which multiple different beams of RF signals are emitted corresponding to different antenna input feeds each communicating with the patterned antenna emitting surface. The antenna assembly is therefore capable of emitting beams in the same direction having different polarizations using a single primary feed. Also described herein are compact RF antenna devices having a lightpipe that passes through the single patterned emitting surface.

20 Claims, 23 Drawing Sheets

Related U.S. Application Data on Apr. 11, 2014, provisional application No. 62/073,833, filed on Oct. 31, 2014.

(51) Int. Cl.
  *H01Q 13/02*  (2006.01)
  *H01Q 19/19*  (2006.01)
  *H01Q 1/40*  (2006.01)
  *H01Q 25/00*  (2006.01)
  *H01Q 15/16*  (2006.01)
  *H01Q 1/42*  (2006.01)

(52) U.S. Cl.
  CPC ......... *H01Q 19/193* (2013.01); *H01Q 21/245* (2013.01); *H01Q 25/001* (2013.01); *H01Q 1/42* (2013.01); *H01Q 1/421* (2013.01); *H01Q 15/16* (2013.01)

(56) References Cited

U.S. PATENT DOCUMENTS

| | | |
|---|---|---|
| 3,599,219 A | 8/1971 | Holtum et al. |
| 3,633,208 A | 1/1972 | Ajioka |
| 3,696,433 A | 10/1972 | Killion et al. |
| 3,739,392 A | 6/1973 | Ross et al. |
| 3,825,874 A | 7/1974 | Peverill |
| 4,578,638 A | 3/1986 | Takano et al. |
| 4,613,868 A | 9/1986 | Weiss |
| 4,626,863 A | 12/1986 | Knop et al. |
| 4,658,262 A | 4/1987 | Duhamel |
| 4,757,324 A | 7/1988 | Dhanjal |
| 4,758,842 A | 7/1988 | Linhardt et al. |
| 4,788,554 A | 11/1988 | Smith |
| 4,918,459 A | 4/1990 | De Teso |
| 4,973,953 A | 11/1990 | Shimokawa et al. |
| 4,992,866 A | 2/1991 | Morgan |
| 5,010,348 A | 4/1991 | Rene et al. |
| 5,131,006 A | 7/1992 | Kamerman et al. |
| 5,151,920 A | 9/1992 | Haagh et al. |
| 5,191,349 A | 3/1993 | Dinsmore et al. |
| 5,295,154 A | 3/1994 | Meier et al. |
| 5,303,413 A | 4/1994 | Braegas |
| 5,307,515 A | 4/1994 | Kuo et al. |
| 5,339,455 A | 8/1994 | Vogt et al. |
| 5,374,911 A | 12/1994 | Kich et al. |
| 5,402,136 A * | 3/1995 | Goto ............... H01Q 1/38 343/700 MS |
| 5,406,260 A | 4/1995 | Cummings et al. |
| 5,416,797 A | 5/1995 | Gilhousen et al. |
| 5,422,887 A | 6/1995 | Diepstraten et al. |
| 5,428,636 A | 6/1995 | Meier |
| 5,503,566 A | 4/1996 | Wang |
| 5,504,746 A | 4/1996 | Meier |
| 5,510,975 A | 4/1996 | Ziegler |
| 5,523,768 A | 6/1996 | Hemmie et al. |
| 5,546,397 A | 8/1996 | Mahany |
| 5,564,093 A | 10/1996 | Matsumoto |
| 5,608,413 A | 3/1997 | Macdonald |
| 5,621,662 A | 4/1997 | Humphries et al. |
| 5,625,365 A | 4/1997 | Tom et al. |
| 5,661,494 A | 8/1997 | Bondyopadhyay |
| 5,666,126 A | 9/1997 | Lange |
| 5,706,428 A | 1/1998 | Boer et al. |
| 5,734,350 A | 3/1998 | Deming et al. |
| 5,740,366 A | 4/1998 | Mahany et al. |
| 5,758,296 A | 5/1998 | Nakamura |
| 5,760,739 A | 6/1998 | Pauli |
| 5,760,749 A | 6/1998 | Minowa et al. |
| 5,782,656 A | 7/1998 | Zell et al. |
| 5,805,111 A | 9/1998 | Brettner et al. |
| 5,844,893 A | 12/1998 | Gollnick et al. |
| 5,872,594 A | 2/1999 | Thompson |
| 5,907,310 A | 5/1999 | Seewig et al. |
| 5,936,542 A | 8/1999 | Kleinrock et al. |
| 5,936,584 A | 8/1999 | Lawrence et al. |
| 5,940,771 A | 8/1999 | Gollnick et al. |
| 5,943,430 A | 8/1999 | Saitoh |
| 6,036,539 A | 3/2000 | Rigby et al. |
| 6,045,402 A | 4/2000 | Embo et al. |
| 6,067,053 A | 5/2000 | Runyon et al. |
| 6,113,431 A | 9/2000 | Wong |
| 6,124,830 A | 9/2000 | Yuanzhu |
| 6,127,987 A | 10/2000 | Maruyama et al. |
| 6,130,892 A | 10/2000 | Short et al. |
| 6,137,449 A | 10/2000 | Kildal |
| 6,169,522 B1 | 1/2001 | Ma et al. |
| 6,184,840 B1 | 2/2001 | Hsin Loug et al. |
| 6,192,282 B1 | 2/2001 | Smith et al. |
| 6,194,992 B1 | 2/2001 | Short et al. |
| 6,206,724 B1 | 3/2001 | Leung |
| 6,208,310 B1 | 3/2001 | Suleiman et al. |
| 6,219,005 B1 | 4/2001 | Szafranek |
| 6,252,559 B1 | 6/2001 | Donn |
| 6,275,922 B1 | 8/2001 | Bertsch |
| 6,313,798 B1 | 11/2001 | Bancroft et al. |
| 6,320,553 B1 | 11/2001 | Ergene |
| 6,326,922 B1 | 12/2001 | Hegendoerfer |
| 6,334,057 B1 | 12/2001 | Malmgren et al. |
| 6,337,990 B1 | 1/2002 | Koshino |
| 6,359,647 B1 | 3/2002 | Sengupta et al. |
| 6,362,783 B1 | 3/2002 | Sugiura et al. |
| 6,374,311 B1 | 4/2002 | Mahany et al. |
| 6,386,913 B1 | 5/2002 | Mohammad et al. |
| 6,386,914 B1 | 5/2002 | Collins et al. |
| 6,411,258 B1 | 6/2002 | Ho |
| 6,425,783 B1 | 7/2002 | Touboul |
| 6,429,827 B1 | 8/2002 | Hsueh et al. |
| 6,437,757 B1 | 8/2002 | Butler |
| 6,462,710 B1 | 10/2002 | Carson et al. |
| 6,501,377 B2 | 12/2002 | Ebata et al. |
| 6,524,119 B2 | 2/2003 | Kato et al. |
| 6,529,234 B2 | 3/2003 | Urisaka et al. |
| 6,535,793 B2 | 3/2003 | Allard |
| 6,563,786 B1 | 5/2003 | Van Nee |
| 6,567,482 B1 | 5/2003 | Popovic |
| 6,593,892 B2 | 7/2003 | Honda et al. |
| 6,597,393 B2 | 7/2003 | Kato et al. |
| 6,618,017 B1 | 9/2003 | Ryken et al. |
| 6,636,894 B1 | 10/2003 | Short et al. |
| 6,643,496 B1 | 11/2003 | Shimoyama et al. |
| 6,665,004 B1 | 12/2003 | Paff |
| 6,665,536 B1 | 12/2003 | Mahany |
| 6,679,728 B1 | 1/2004 | Huang et al. |
| 6,697,415 B1 | 2/2004 | Mahany |
| 6,714,559 B1 | 3/2004 | Meier |
| 6,738,582 B1 | 5/2004 | Moshe et al. |
| 6,759,957 B2 | 7/2004 | Murakami et al. |
| 6,789,110 B1 | 9/2004 | Short et al. |
| 6,795,852 B1 | 9/2004 | Kleinrock et al. |
| 6,808,414 B2 | 10/2004 | Spiegel et al. |
| 6,810,426 B2 | 10/2004 | Mysore et al. |
| 6,844,862 B1 | 1/2005 | Cencich et al. |
| 6,845,297 B2 | 1/2005 | Allard |
| 6,857,009 B1 | 2/2005 | Ferreria et al. |
| 6,865,169 B1 | 3/2005 | Quayle et al. |
| 6,868,399 B1 | 3/2005 | Short et al. |
| 6,945,817 B2 | 9/2005 | Miyazaki et al. |
| 6,954,859 B1 | 10/2005 | Simerly et al. |
| 6,968,173 B2 | 11/2005 | Cowley |
| 6,970,680 B1 | 11/2005 | Tomoe |
| 6,970,751 B2 | 11/2005 | Gonzales et al. |
| 6,977,585 B2 | 12/2005 | Falk et al. |
| 6,997,753 B2 | 2/2006 | Broomall et al. |
| 7,020,082 B2 | 3/2006 | Bhagavath et al. |
| 7,086,898 B2 | 8/2006 | Johnsen et al. |
| 7,088,727 B1 | 8/2006 | Short et al. |
| 7,095,321 B2 | 8/2006 | Primm et al. |
| 7,117,043 B1 | 10/2006 | Frederick et al. |
| 7,117,526 B1 | 10/2006 | Short |
| 7,155,196 B1 | 12/2006 | Beard |
| 7,194,554 B1 | 3/2007 | Short et al. |
| 7,197,556 B1 | 3/2007 | Short et al. |
| 7,252,555 B2 | 8/2007 | Moessinger |
| 7,254,191 B2 | 8/2007 | Sugar et al. |

(56) References Cited

U.S. PATENT DOCUMENTS

| | | |
|---|---|---|
| 7,286,095 B2 | 10/2007 | Parsche et al. |
| 7,295,812 B2 | 11/2007 | Haapoja et al. |
| 7,319,477 B2 | 1/2008 | Katz |
| 7,353,114 B1 | 4/2008 | Rohlf et al. |
| 7,386,002 B2 | 6/2008 | Meier |
| 7,413,474 B2 | 8/2008 | Liu et al. |
| 7,430,442 B2 | 9/2008 | He et al. |
| 7,457,646 B2 | 11/2008 | Mahany et al. |
| 7,483,984 B1 | 1/2009 | Jonker et al. |
| 7,526,539 B1 | 4/2009 | Hsu |
| 7,555,658 B2 | 6/2009 | Vahid et al. |
| 7,584,020 B2 | 9/2009 | Bruemmer et al. |
| 7,587,260 B2 | 9/2009 | Bruemmer et al. |
| 7,636,559 B2 | 12/2009 | Magnusen et al. |
| 7,656,363 B2 | 2/2010 | Devicque et al. |
| 7,668,621 B2 | 2/2010 | Bruemmer |
| 7,683,940 B2 | 3/2010 | Fleming |
| 7,696,940 B1 | 4/2010 | Macdonald |
| 7,710,940 B2 | 5/2010 | Van Der Wal et al. |
| 7,715,800 B2 | 5/2010 | Sinha |
| 7,733,835 B2 | 6/2010 | Sammour et al. |
| 7,734,038 B2 | 6/2010 | Martich et al. |
| 7,739,383 B1 | 6/2010 | Short et al. |
| 7,752,334 B2 | 7/2010 | Paunikar et al. |
| 7,783,390 B2 | 8/2010 | Miller |
| 7,791,466 B2 | 9/2010 | Agarwalla et al. |
| 7,801,644 B2 | 9/2010 | Bruemmer et al. |
| 7,826,426 B1 | 11/2010 | Bharghavan et al. |
| 7,839,926 B1 | 11/2010 | Metzger et al. |
| 7,848,263 B2 | 12/2010 | Chhabra |
| 7,865,252 B2 | 1/2011 | Clayton |
| 7,934,952 B2 | 5/2011 | Pera |
| 7,974,738 B2 | 7/2011 | Bruemmer et al. |
| 8,013,732 B2 | 9/2011 | Petite et al. |
| 8,031,650 B2 | 10/2011 | Petite et al. |
| 8,042,048 B2 | 10/2011 | Wilson et al. |
| 8,060,582 B2 | 11/2011 | Bliss et al. |
| 8,073,564 B2 | 12/2011 | Bruemmer et al. |
| 8,077,113 B2 | 12/2011 | Syed et al. |
| 8,154,398 B2 | 4/2012 | Rolf et al. |
| 8,165,041 B2 | 4/2012 | Wang et al. |
| 8,184,061 B2 | 5/2012 | Sanford |
| 8,184,064 B2 | 5/2012 | Sanford |
| 8,190,708 B1 | 5/2012 | Short et al. |
| 8,219,059 B2 | 7/2012 | Pera et al. |
| 8,270,767 B2 | 9/2012 | Park |
| 8,306,634 B2 | 11/2012 | Nguyen et al. |
| 8,310,335 B2 | 11/2012 | Sivakkolundhu |
| 8,335,272 B2 | 12/2012 | Roberts |
| 8,350,697 B2 | 1/2013 | Trundle et al. |
| 8,385,869 B2 | 2/2013 | Feenaghty et al. |
| 8,390,684 B2 | 3/2013 | Piran et al. |
| 8,400,997 B2 | 3/2013 | Pera et al. |
| 8,421,700 B2 | 4/2013 | Sanford |
| 8,421,704 B2 | 4/2013 | Sanford |
| 8,429,435 B1 | 4/2013 | Clayton et al. |
| 8,466,847 B2 | 6/2013 | Pera et al. |
| 8,467,759 B2 | 6/2013 | Pera et al. |
| 8,478,450 B2 | 7/2013 | Lu et al. |
| 8,483,188 B2 | 7/2013 | Walton et al. |
| 8,489,065 B2 | 7/2013 | Green et al. |
| 8,489,646 B2 | 7/2013 | Sinha et al. |
| 8,493,279 B2 | 7/2013 | Pera et al. |
| 8,581,795 B2 | 11/2013 | Simms et al. |
| 8,619,136 B2 | 12/2013 | Howarter et al. |
| 8,698,684 B2 | 4/2014 | Sanford |
| 8,698,687 B2 | 4/2014 | Pera et al. |
| 8,736,503 B2 | 5/2014 | Zaghloul et al. |
| 8,761,142 B2 | 6/2014 | Dayanandan et al. |
| 8,804,622 B1 | 8/2014 | Thai et al. |
| 8,836,601 B2 | 9/2014 | Sanford et al. |
| 8,855,730 B2 | 10/2014 | Sanford |
| 8,879,574 B2 | 11/2014 | Dayanandan et al. |
| 8,880,204 B2 | 11/2014 | Frei et al. |
| 8,902,120 B2 | 12/2014 | Sanford |
| 8,941,976 B1 | 1/2015 | Maroney |
| 2001/0046258 A1 | 11/2001 | Wise et al. |
| 2002/0015393 A1 | 2/2002 | Pan et al. |
| 2002/0044032 A1 | 4/2002 | Guguen et al. |
| 2002/0098805 A1 | 7/2002 | King |
| 2002/0105475 A1 | 8/2002 | Overton et al. |
| 2002/0113744 A1 | 8/2002 | Strickland |
| 2002/0142780 A1 | 10/2002 | Airy et al. |
| 2002/0187760 A1 | 12/2002 | Krishmar Junker et al. |
| 2003/0032398 A1 | 2/2003 | Harris |
| 2003/0038753 A1 | 2/2003 | Mahon |
| 2003/0098812 A1 | 5/2003 | Ying et al. |
| 2003/0169522 A1 | 9/2003 | Schofield et al. |
| 2003/0189516 A1 | 10/2003 | Olson |
| 2003/0203743 A1 | 10/2003 | Sugar et al. |
| 2003/0207669 A1 | 11/2003 | Kroeger |
| 2003/0217136 A1 | 11/2003 | Cho et al. |
| 2003/0221304 A1 | 12/2003 | Janssen et al. |
| 2003/0224728 A1 | 12/2003 | Heinonen et al. |
| 2003/0224801 A1 | 12/2003 | Lovberg et al. |
| 2003/0233660 A1 | 12/2003 | Slemmer et al. |
| 2004/0108966 A1 | 6/2004 | McKivergan et al. |
| 2004/0133913 A1 | 7/2004 | Benveniste |
| 2004/0151126 A1 | 8/2004 | Matsubara |
| 2004/0209521 A1 | 10/2004 | Cooper et al. |
| 2004/0233107 A1 | 11/2004 | Popov et al. |
| 2005/0048835 A1 | 3/2005 | Clark |
| 2005/0048971 A1 | 3/2005 | Findikli et al. |
| 2005/0057700 A1 | 3/2005 | Lim et al. |
| 2005/0136880 A1 | 6/2005 | Subasic et al. |
| 2005/0152306 A1 | 7/2005 | Bonnassieux et al. |
| 2005/0245254 A1 | 11/2005 | Hall |
| 2006/0001589 A1 | 1/2006 | Nicolae |
| 2006/0007044 A1 | 1/2006 | Crouch et al. |
| 2006/0009177 A1 | 1/2006 | Persico et al. |
| 2006/0050677 A1 | 3/2006 | Schafer |
| 2006/0057986 A1 | 3/2006 | Wakui et al. |
| 2006/0079230 A1 | 4/2006 | Russell |
| 2006/0090923 A1 | 5/2006 | Fetterolf et al. |
| 2006/0116170 A1 | 6/2006 | Brahmbhatt et al. |
| 2006/0128371 A1 | 6/2006 | Dillon et al. |
| 2006/0253205 A1 | 11/2006 | Gardiner |
| 2006/0258315 A1 | 11/2006 | Fein et al. |
| 2006/0281433 A1 | 12/2006 | Yang et al. |
| 2007/0042732 A1 | 2/2007 | Kang et al. |
| 2007/0053362 A1 | 3/2007 | Garg |
| 2007/0057860 A1 | 3/2007 | Jaffer et al. |
| 2007/0075909 A1 | 4/2007 | Flynn et al. |
| 2007/0086424 A1 | 4/2007 | Calcev et al. |
| 2007/0132651 A1 | 6/2007 | Nilsson |
| 2007/0157482 A1 | 7/2007 | Wallace |
| 2007/0188615 A1 | 8/2007 | Beniyama et al. |
| 2007/0205847 A1 | 9/2007 | Kushta et al. |
| 2007/0238419 A1 | 10/2007 | Dubois et al. |
| 2007/0274249 A1 | 11/2007 | Hulbert et al. |
| 2007/0282944 A1 | 12/2007 | Odaka et al. |
| 2008/0009967 A1 | 1/2008 | Bruemmer |
| 2008/0036657 A1 | 2/2008 | Oomuro |
| 2008/0048927 A1 | 2/2008 | Hoshi |
| 2008/0051053 A1 | 2/2008 | Fedan |
| 2008/0056125 A1 | 3/2008 | Kneckt et al. |
| 2008/0080553 A1 | 4/2008 | Hasty et al. |
| 2008/0113552 A1 | 5/2008 | Casperson et al. |
| 2008/0125129 A1 | 5/2008 | Lee |
| 2008/0136713 A1 | 6/2008 | Fu et al. |
| 2008/0151801 A1 | 6/2008 | Mizuta |
| 2008/0159239 A1 | 7/2008 | Odlyzko et al. |
| 2008/0162048 A1 | 7/2008 | Yang et al. |
| 2008/0165731 A1 | 7/2008 | Zellner |
| 2008/0165735 A1 | 7/2008 | Chen et al. |
| 2008/0175265 A1 | 7/2008 | Yonge et al. |
| 2008/0192644 A1 | 8/2008 | Utsunomiya et al. |
| 2008/0199037 A1 | 8/2008 | Xu et al. |
| 2008/0211929 A1 | 9/2008 | Uchihara |
| 2008/0212612 A1 | 9/2008 | Singh et al. |
| 2008/0219198 A1 | 9/2008 | Honkasalo et al. |
| 2008/0224938 A1 | 9/2008 | Udagawa et al. |
| 2008/0231538 A1 | 9/2008 | Inque et al. |
| 2008/0240107 A1 | 10/2008 | Parekh et al. |

(56) References Cited

U.S. PATENT DOCUMENTS

| | | |
|---|---|---|
| 2008/0240313 A1 | 10/2008 | Deisher et al. |
| 2008/0261548 A1 | 10/2008 | Krone |
| 2008/0291873 A1 | 11/2008 | Benveniste |
| 2008/0297425 A1 | 12/2008 | Axton et al. |
| 2008/0309535 A1 | 12/2008 | Le Guillou |
| 2009/0003374 A1 | 1/2009 | Morrissey et al. |
| 2009/0070477 A1 | 3/2009 | Baum et al. |
| 2009/0096689 A1 | 4/2009 | Krajicek |
| 2009/0157844 A1 | 6/2009 | Fionda et al. |
| 2009/0174622 A1 | 7/2009 | Kanou |
| 2009/0191751 A1 | 7/2009 | Barsigian et al. |
| 2009/0195467 A1 | 8/2009 | Vassilakis et al. |
| 2009/0234499 A1 | 9/2009 | Nielsen et al. |
| 2009/0237314 A1 | 9/2009 | Lalezari |
| 2009/0240791 A1 | 9/2009 | Sakurai et al. |
| 2009/0245227 A1 | 10/2009 | Chin et al. |
| 2009/0252127 A1 | 10/2009 | Rangarajan et al. |
| 2009/0257239 A1 | 10/2009 | Burton |
| 2009/0307255 A1 | 12/2009 | Park |
| 2009/0310721 A1 | 12/2009 | Redfern et al. |
| 2010/0007561 A1 | 1/2010 | Bucca et al. |
| 2010/0013729 A1 | 1/2010 | Harel et al. |
| 2010/0023865 A1 | 1/2010 | Fulker et al. |
| 2010/0039979 A1 | 2/2010 | Takase et al. |
| 2010/0053022 A1 | 3/2010 | Mak et al. |
| 2010/0097473 A1 | 4/2010 | Park et al. |
| 2010/0106860 A1 | 4/2010 | Li et al. |
| 2010/0115415 A1 | 5/2010 | Hickey |
| 2010/0152897 A1 | 6/2010 | Muller |
| 2010/0177012 A1 | 7/2010 | Marrow |
| 2010/0218004 A1 | 8/2010 | Cousy |
| 2010/0232324 A1 | 9/2010 | Radunovic et al. |
| 2010/0232400 A1 | 9/2010 | Patil et al. |
| 2010/0245187 A1 | 9/2010 | Omuro et al. |
| 2010/0280635 A1 | 11/2010 | Cohn et al. |
| 2010/0280637 A1 | 11/2010 | Cohn et al. |
| 2010/0285769 A1 | 11/2010 | Conroy et al. |
| 2010/0289705 A1* | 11/2010 | Shtrom ............... H01Q 9/0442 343/702 |
| 2010/0295736 A1 | 11/2010 | Su |
| 2010/0298957 A1 | 11/2010 | Sanchez Rocha et al. |
| 2010/0306320 A1 | 12/2010 | Leppanen et al. |
| 2011/0012801 A1 | 1/2011 | Monte et al. |
| 2011/0013601 A1 | 1/2011 | Cerasa et al. |
| 2011/0053536 A1 | 3/2011 | Friedmann |
| 2011/0058036 A1 | 3/2011 | Metzger et al. |
| 2011/0068988 A1 | 3/2011 | Monte |
| 2011/0090129 A1 | 4/2011 | Weily et al. |
| 2011/0115816 A1 | 5/2011 | Brackney |
| 2011/0150401 A1 | 6/2011 | Furuyama |
| 2011/0168480 A1 | 7/2011 | Sterling et al. |
| 2011/0181479 A1 | 7/2011 | Martin et al. |
| 2011/0185011 A1 | 7/2011 | Shuman et al. |
| 2011/0211559 A1 | 9/2011 | Lim et al. |
| 2011/0258678 A1 | 10/2011 | Cowling et al. |
| 2011/0260934 A1 | 10/2011 | Ilno et al. |
| 2011/0294342 A1 | 12/2011 | DeBock et al. |
| 2012/0013516 A1 | 1/2012 | Ahn et al. |
| 2012/0019418 A1 | 1/2012 | Wong et al. |
| 2012/0096271 A1 | 4/2012 | Ramarathinam et al. |
| 2012/0127977 A1 | 5/2012 | Copeland et al. |
| 2012/0130513 A1 | 5/2012 | Hao et al. |
| 2012/0158161 A1 | 6/2012 | Cohn et al. |
| 2012/0176608 A1 | 7/2012 | McCown |
| 2012/0188892 A1 | 7/2012 | Demilie et al. |
| 2012/0210147 A1 | 8/2012 | Musti et al. |
| 2012/0213086 A1 | 8/2012 | Matsuura |
| 2012/0226366 A1 | 9/2012 | Lee et al. |
| 2012/0250793 A1 | 10/2012 | Khatana et al. |
| 2012/0257862 A1 | 10/2012 | Deel et al. |
| 2013/0002515 A1 | 1/2013 | Hills et al. |
| 2013/0012134 A1 | 1/2013 | Jin et al. |
| 2013/0017794 A1 | 1/2013 | Kloper et al. |
| 2013/0028150 A1 | 1/2013 | Ma et al. |
| 2013/0035774 A1 | 2/2013 | Warren et al. |
| 2013/0051286 A1 | 2/2013 | Schultz et al. |
| 2013/0067564 A1 | 3/2013 | Fok Ah Cheun et al. |
| 2013/0077606 A1 | 3/2013 | Wu et al. |
| 2013/0107869 A1 | 5/2013 | Abraham et al. |
| 2013/0129091 A1 | 5/2013 | Kang et al. |
| 2013/0135146 A1 | 5/2013 | Ransom et al. |
| 2013/0154894 A1 | 6/2013 | Caimi et al. |
| 2013/0163770 A1 | 6/2013 | Takemura |
| 2013/0201316 A1 | 8/2013 | Binder et al. |
| 2013/0249754 A1 | 9/2013 | Rice |
| 2013/0252567 A1 | 9/2013 | Pera et al. |
| 2013/0271337 A1 | 10/2013 | Lee et al. |
| 2013/0333005 A1 | 12/2013 | Kim et al. |
| 2014/0005809 A1 | 1/2014 | Frei et al. |
| 2014/0005810 A1 | 1/2014 | Frei et al. |
| 2014/0005851 A1 | 1/2014 | Frei et al. |
| 2014/0006506 A1 | 1/2014 | Frei et al. |
| 2014/0006552 A1 | 1/2014 | Frei et al. |
| 2014/0006605 A1 | 1/2014 | Frei et al. |
| 2014/0022918 A1 | 1/2014 | Guo et al. |
| 2014/0115354 A1 | 4/2014 | Jabbaz et al. |
| 2014/0118203 A1 | 5/2014 | Sanford |
| 2014/0118220 A1 | 5/2014 | Ley |
| 2014/0140228 A1 | 5/2014 | Dayanandan et al. |
| 2014/0140232 A1 | 5/2014 | Dayanandan et al. |
| 2014/0143374 A1 | 5/2014 | Huang et al. |
| 2014/0218248 A1 | 8/2014 | Schulz et al. |
| 2014/0219142 A1 | 8/2014 | Schulz et al. |
| 2014/0220903 A1 | 8/2014 | Schulz et al. |
| 2014/0225782 A1 | 8/2014 | Sanford |
| 2014/0225788 A1 | 8/2014 | Schulz et al. |
| 2014/0225802 A1 | 8/2014 | Huerta et al. |
| 2014/0225803 A1 | 8/2014 | Huerta et al. |
| 2014/0245160 A1 | 8/2014 | Bauer et al. |
| 2014/0258742 A1 | 9/2014 | Chien et al. |
| 2014/0274177 A1 | 9/2014 | Carbajal |
| 2014/0315599 A1 | 10/2014 | Teichmann et al. |
| 2014/0329522 A1 | 11/2014 | Dayanandan et al. |
| 2015/0002357 A1 | 1/2015 | Sanford et al. |
| 2015/0105038 A1 | 4/2015 | Lascari et al. |
| 2015/0292948 A1 | 10/2015 | Goldring et al. |
| 2015/0381293 A1 | 12/2015 | Hardy et al. |
| 2016/0104941 A1 | 4/2016 | Lee et al. |
| 2016/0112074 A1 | 4/2016 | Lascari et al. |
| 2017/0229773 A1 | 8/2017 | Lee et al. |

FOREIGN PATENT DOCUMENTS

| | | |
|---|---|---|
| JP | 2002299940 A | 10/2002 |
| JP | 2007259001 | 10/2007 |
| JP | 2010192992 A | 9/2010 |
| JP | 2012227863 A | 11/2012 |
| KR | 20020095556 | 12/2002 |
| KR | 10-2008-0079357 | 9/2008 |
| KR | 20-0450128 Y1 | 8/2010 |
| KR | 10-1023789 B1 | 3/2011 |
| KR | 10-1068766 B1 | 9/2011 |
| KR | 10-2013-0141939 | 12/2013 |
| WO | WO98/40990 A1 | 9/1998 |
| WO | WO99/34477 A1 | 7/1999 |
| WO | WO01/31855 A2 | 5/2001 |
| WO | WO01/31886 A2 | 5/2001 |
| WO | WO01/86877 A2 | 11/2001 |
| WO | WO03/023987 A1 | 3/2003 |
| WO | WO2006/044783 A2 | 4/2006 |
| WO | WO2008/042804 A2 | 4/2008 |
| WO | WO2008/154514 A2 | 12/2008 |
| WO | WO2009/131219 A1 | 10/2009 |
| WO | WO2009/146342 A1 | 12/2009 |
| WO | WO2010/049113 A1 | 5/2010 |
| WO | WO2011/005710 A2 | 1/2011 |

OTHER PUBLICATIONS

Sanford, John; U.S. Appl. No. 14/170,507 entitled "Coaxial RF Dual-Polarized Waveguide Filter and Method," filed Jan. 31, 2014.
Hardy et al.; U.S. Appl. No. 14/639,909 entitled "Cloud device identification and authentication," filed Mar. 5, 2015.

(56) References Cited

OTHER PUBLICATIONS

Pera et al.; U.S. Appl. No. 14/639,892 entitled "Power receptacle wireless access point devices for networked living and work spaces," filed Mar. 5, 2015.
Pera et al.; U.S. Appl. No. 14/639,905 entitled "Wall-mounted interactive sensing and audio-visual devices for networked living and work spaces," filed Mar. 5, 2015.
Dayanandan et al.; U.S. Appl. No. 14/659,397 entitled "Methods of operating an access point using a plurality of directional beams," filed Mar. 16, 2015.
Sanford et al.; U.S. Appl. No. 14/659,424 entitled "Array antennas having a plurality of directional beams," filed Mar. 16, 2015.
Sanford; U.S. Appl. No. 14/659,445 entitled "Compact radio frequency lenses," filed Mar. 16, 2015.
Sanford et al.; U.S. Appl. No. 14/676,600 entitled "Antenna assembly," filed Apr. 1, 2015.
Paolini-Subramanya; U.S. Appl. No. 14/708,077 entitled "Phone systems and methods of communication," filed May 8, 2015.
Ashtaiwi et al.; Utilizing IEEE 802.11n to enhance QoS support in wireless mesh networks; (LCN 2008) 33rd IEEE Conf. on Loacal Computer Networks; pp. 689-696; Oct. 14-17, 2008.
CISCO; Cisco NX-OS Software: Business-Critical Cross-Platform Data Center OS (white paper); retrieved from the internet on Jul. 9, 2014 (http://www.cisco.com/c/en/us/products/collateral/switches/nexus-7000-series-switches/white_paper_c11-622511.pdf); 14 pgs.; © 2010.
El-Basioni et al.; Smart home design using wireless sensor network and biometric technologies; International Journal of Application or Innovation in Engineering & Management; 2(3); pp. 413-429; Mar. 2013.
Hajlaoui et al.; A frame aggregation scheduler for QoS-sensitive applications in IEEE802.11n WLANs; (ICCIT) Int. Conf. on Communications and Information Tech.; pp. 221-226; Jun. 26-28, 2012.
Iljima et al.; NETCONF over WebSocket; 82nd IETF Meeting, Taipei, Taiwan; retrived from the internet (http://www.ietf.org/proceedings/82/slides/netconf-1.pdf); 9 pgs.; Nov. 13-18, 2011.
Internet Engineering Task Force (IETF); The WebSocket Protocol; 72 pgs.; Dec. 2011; retrieved from the internet on Mar. 6, 2014 from https://tools.ietf.org/html/rfc6455.
Kishk et al.; Conical dielectric resonator antennas for wide-band applications; IEEE Trans.; vol. AP-50; Issue 4; pp. 469-474; Apr. 2002.
Lewis, F. L.; Chapter 2: Wireless Sensor Networks; in Smart Environments: Technologies, Protocols, and Applications (eds Cook and Das); John Wiley & Sons, Inc.; Hoboken, NJ, USA; Sep. 2004 (pre-publication copy, 18 pgs.).
Liang et al.; Design and implementation of wireless smart-home sensor network based on ZigBee protocol; IEEE; International Conf. on Communications; Circuits and systems, ICCCAS 2008; May 25-27, 2008.
Liu et al.; Design of antenna radome composed of metamaterials for high gain; Antenna and Propogation Society Symposium; IEEE; pp. 19-22; Jul. 9-14, 2006.
Marcincak, Martin; AirGrid M5; 3 pgs.; Jan. 27, 2010; retrieved from the internet: http://www.youtube.com/watch?v=L4Z99Uzz-Bc (this web address was available to applicant(s) at least as of Jan. 27, 2010).
Nakajima et al.; A simple and efficient selective repeat scheme for high throughput WLAN; IEEE802.11n; IEEEVTS Vehicular Tech. Conf. Proc.; pp. 1302-1306; Apr. 22-25, 2007.
Netvox; Intelligent home automation system (Product Catalog); 123 pgs.; retrieved from the internet on Jul. 8, 2014 (http://www.netvox.com.tw/download/Netvox%20Catalog(English%20Version)%2020131129.pdf).
Open Networking Foundation; OpenFlow management and configuration protocol (OF-Config 1.1); retrieved from the internet: (www.opennetworking.org/images/stories/downloads/sdn-resources/onf-specifications/openflow-config/of-config-1.1pdf); 117 pgs.; Jun. 25, 2012.
Rosenberg et al.; Session Traversal Utilities for NAT (STUN); 52 pgs.; Oct. 2008; retrieved from the internet on Mar. 6, 2014 from http://tools.ietf.org/search/rfc5389.
Russell et al.; The Bayeux Specification; 25 pgs.; 2007; retrieved from the internet on Mar. 6, 2014 from http://svn.cometd.org/trunk/bayeux/bayeux.html.
Streakwave Wireless; Ubiquiti Nanobridge m Series Product Overview; 2 pgs.; Jan. 12, 2012; retrieved from the internet: http//www.youtube.com/watch?v=DF_hx6iDIAM (this web address was available to applicant(s) at least as of Jan. 12, 2012).
Ubiquiti Networks; AirGrid M Datasheet; © 2011-2013; pp. 1-10; Jun. 21, 2013; retrieved from the internet (http://dl.ubnt.com/datasheets/airgridm/agmhp_datasheet_web.pdf).
Ubiquiti Networks; Nanobridge M Quick Start Guide; 20 pgs.; Mar. 27, 2012; retrieved from the internet (http://dl.ubnt.com/guides/nanobridge/nanobridge_M_QSG.pdf).
Zhang et al.; Prediction-based link-layer dynamic fragmentation and aggregation for wireless mesh networks; 2008 ISECS int. Colloquium on Computing, Communication, Control, and Management; vol. 2; pp. 582-586; Aug. 3-4, 2008.
Lee et al.; U.S. Appl. No. 15/262,564 entitled "Compact public address access point apparatus," filed Sep. 12, 2016.
Le-Ngoc et al.; Design aspects and performance evaluation of ATCS mobile data link; IEEE 39th; InVehicular Technology Conference; pp. 860-867; May 1, 1989.

\* cited by examiner

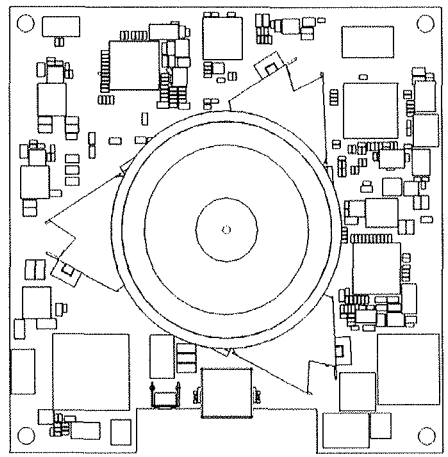
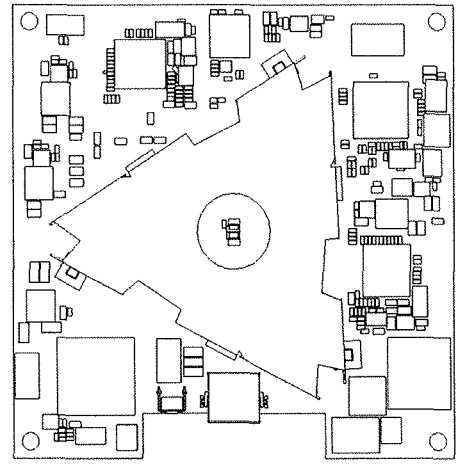
FIG. 16　　　　　　　　FIG. 18
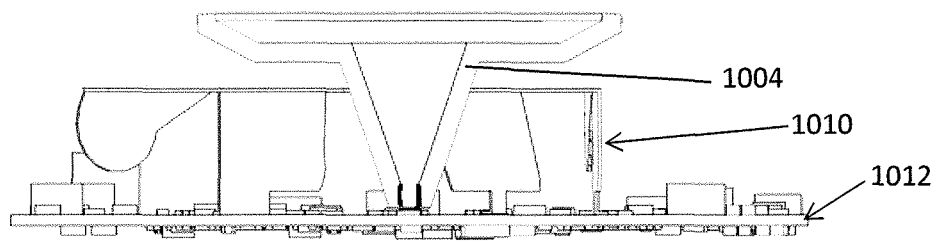
FIG. 17A
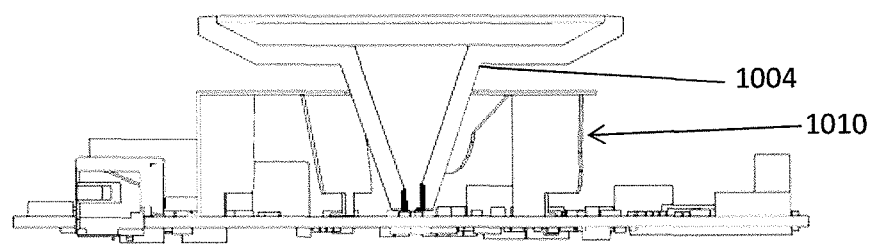
FIG. 17B

COMPACT RADIO FREQUENCY ANTENNA APPARATUSES

CROSS REFERENCE TO RELATED APPLICATIONS

This patent application claims priority to each of the following U.S. provisional patent applications: U.S. Provisional Patent Application No. 61/973,750, filed Apr. 1, 2014, titled "ANTENNA ASSEMBLY;" U.S. Provisional Patent Application No. 61/978,755, filed Apr. 11, 2014, titled "ANTENNA ASSEMBLY;" and U.S. Provisional Patent Application No. 62/073,833, filed Oct. 31, 2014, titled "MULTI-FOCAL POINT ANTENNA ASSEMBLIES." Each of these provisional patent applications is herein incorporated by reference in its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

FIELD

Described herein are wireless radio and antenna apparatuses and methods that may form part of a broadband wireless system. The apparatus may be used for accessing the internet, even in relatively remote regions, and in particular may operate as multiple-input, multiple-output (MIMO) antennas having a single emitter which is capable of directing multiple (e.g., three or more) beams therefrom. The wireless transmission stations described herein may be configured for indoor, outdoor, or indoor and outdoor use.

BACKGROUND

There is an increasing demand for radio frequency (RF) communication systems to provide high-speed data transmissions in a reliable manner. In order to enable high-speed data transmission over a wireless channel, which uses limited bandwidth and power, it may be important to increase capacity. The reliability of reception signals may be greatly degraded by fading, shadowing, wave attenuation, interference, etc. An antenna that is capable of multiple input/multiple output (MIMO) operation, without requiring a number of separate antennas and/or separate antenna emitters, that could be reliably and inexpensively manufactured and provide reliable operation may address these problems and provide numerous other advantages.

Typically, MIMO antenna technology uses a spatial multiplexing technique for transmitting data at high speeds without further increasing the system's bandwidth, by using multiple antennas at the transmitter or receiver to transmit different data simultaneously. However, the use of multiple antennas may be expensive in both actual cost and in the footprint and size of the arrangement. Thus, it would be particularly beneficial to provide an antenna that may operate in a MIMO configuration, and particularly in an i×p arrangement (where i is a positive integer greater than 3, and p is some integer greater than 2), allowing operation with multiple streams of RF data from a single compact antenna, and particularly an antenna having a single emitter.

To date, most MIMO antennas have an arrayed antenna structure that uses multiple radiators (emitters), and since a multiple number of radiators are used, there can be interference occurring between the radiators. Such interference can distort the radiating pattern or create a mutual coupling effect among the radiators. In order to minimize interference between radiators, a MIMO antenna may use an isolation element, i.e. a separate feature, or may use a structure in which the radiators are widely separated from one another. In these cases, providing the desired isolation basically involves providing a sufficient distance between two antennas, even in cases where a separate isolation element is used. However, since the demand for smaller terminals is an ongoing requirement, and since providing a sufficient distance between multiple antennas not only is very difficult but also runs contrary to providing smaller terminal sizes, there is a need for an isolation technique that can be applied for multiple antennas that are positioned relatively closely to one another.

Households and businesses in areas without wired connections (e.g., in regions that cannot be reached via conventional communication media, such as optical cables, copper cables, and/or other fixed wire-based technologies) may rely on fixed wireless services for some of these services (e.g., broadband access). Fixed wireless services can be made more attractive to customers by effectively leveraging existing customer premises equipment (CPE).

There is a growing need to develop systems to deliver broadband to remote and under-served regions, for which traditional broadband (e.g., wired or cabled delivery) is not available or possible. Delivering high performance networking in underserved and underpenetrated regions is challenging because of the lack of durable and powerful systems, including antenna-based systems, capable of operating with sufficient flexibility to provide point-to-point as well as point-to-multipoint communication between client stations (e.g., home or business locations) and an internet service provider, including wireless internet service providers.

To keep the costs of these devices down, so that they may be provided to even underserved communities at a reasonable price, the antennas are produced to be reliable, easy to manufacture, and easy to use. In addition, these antennas have a sufficiently large bandwidth in an appropriate band. Further, the devices are compact, yet have minimal line radiation and other sources of noise.

The systems may include user-friendly devices including amplifying, broadband radios/antenna that are robust (including for use in outdoor regions), and easy to install and use. Described herein are antennas that may be used for MIMO operation that may resolve the problems described above and provide an antenna having a single emitter adapted to emit three or more independent beams using a patterned antenna radiating emitter. These antennas may therefore also be referred to as multi-focal-point antennas. As described in greater detail below, the antennas described herein can provide isolation of the three or more beams even using a single (relatively small) emitter.

The devices described herein may also be of particular use to deliver broadband data services to remote and under-served regions, for which traditional broadband (e.g., wired or cabled delivery) is not available or possible. Delivering high performance networking in underserved and underpenetrated regions is challenging because of the lack of durable and powerful systems, including antenna-based systems, capable of operating with sufficient flexibility to provide point-to-point as well as point-to-multipoint communication between client stations (e.g., home or business locations) and an internet service provider, including wireless internet service providers. In addition, the systems described herein may also be of particular use when delivering information in congested urban areas, which may otherwise provide numerous barriers to transmission. Thus, described herein are apparatuses (e.g., devices and systems) and methods of operating them that may address the issue raised above.

SUMMARY OF THE DISCLOSURE

Described herein are antenna assemblies that may be configured as wireless transmission stations, such as wireless broadband access devices. These antenna assemblies may include a primary feed with a single emitting/receiving plate (e.g., patterned antenna radiating emitter) that this adapted to transmit and receive electromagnetic energy in three or more independent beams. The emitting/receiving plate may be referred to herein as an emitter, or a patterned antenna radiating emitter, or the like. The patterned antenna radiating emitter is configured so that a plurality of three or more independent (and isolated from each other) input feeds connect to the patterned antenna radiating emitter.

Any of the antenna assemblies described herein may also be configured to include dual antenna reflectors for transmission of the multiple beams in the same direction (e.g., from the same pair of dual reflectors). The emitted RF signals, which may be referred to as beams, are emitted from the primary feed, and may include a plurality (2 or more, e.g., 3, 4, 5, etc.) of beams that are differently polarized. For example, the beams may be rotated versions of each other, including orthogonal beams. The same primary feed, including a single emitting surface may be used to emit all of the differently polarized beams. Each differently polarized beam is emitted from a different portion of the patterned antenna emitting surface of the primary feed, so that the differently polarized beams are directed to the secondary reflector, which is positioned opposite from the patterned antenna emitting surface of the primary feed and reflects the emitted beams towards the primary reflector that is oriented to direct the beams outward, away from the patterned antenna emitting surface of the primary feed. Each differently polarized beam may be reflected from a different sub-region of the secondary reflector and then from a sub-region of the primary reflector. The secondary reflector may be a generally convex reflector that directs the electromagnetic energy (beam) towards the primary reflector. The primary reflector may be a generally concave reflector that directs the electromagnetic energy. For example, the secondary reflector may be within a concavity formed in the parabolic primary reflector. In variations including dual reflectors, the differently polarized beams may be emitted in the same direction from the primary reflector, and the phase front of all of the beams may be uniform. Any of these apparatuses may include a shaped radome over the primary (and secondary) reflector to help tune (e.g., by lensing through the radome) the phase front of the RF energy transmitted through the radome. In some variations a pair of radomes may be used, including one that is curved to act as a lens to make the phase front of emitted RF signals more uniform. RF signals (beams) may be received by the apparatus in a similar way, e.g., reflected by the primary reflector to the second reflector and onto the patterned antenna emitting surface of the primary feed.

The antenna assemblies and methods described herein, including devices and systems, may be wireless broadband access devices that are configurable as a point-to-point or point-to-multipoint stations.

Any of the antenna assemblies described herein may include radio circuitry for generating and/or receiving RF signals of different polarizations (e.g., n different polarizations, where n is greater than 2, greater than 3, etc.). The radio (e.g., control) circuitry may be configured to control transmission and receipt of broadband information to and from the antenna.

For example, described herein are multi-focal-point antenna device having a single emitter adapted to emit three or more independent beams. Such devices may include: a patterned antenna radiating emitter, wherein the patterned antenna radiating emitter comprises a sheet of metal having a plurality of cut-out regions along one or more edges of the patterned antenna radiating emitter; n antenna input feeds, where n is 3 or more, separately extending to the patterned antenna radiating emitter, wherein each of the n antenna input feeds are independent and electrically isolated from each other; and a radio circuitry coupled to each of the n antenna input feeds, wherein the radio circuitry is configured to transmit radio frequency (RF) signals so that each of the n antenna input feeds transmits at a different polarization, wherein the patterned antenna radiating emitter emits n beams in which each of the n beams is differently polarized, and wherein the beams do not couple with each other.

In operation, each of the n beams may act as a separate "antenna" for MIMO, as each beam will have a different path between the transmitter and receiver. Thus, a single antenna capable of producing multiple antenna beams from a single emitter element, as described herein, may be used in a MIMO configuration.

Any of the devices described herein may include a primary reflector that separately reflects each of the beams. For example, the reflector may have n wedge-shaped surface regions, each of the n surface regions reflecting one or the n emitted beams. The apparatus may also include a secondary reflector having n wedge-shaped surface regions, each of the n surface regions may reflect one of the n emitted beams to one of the n surface regions of the primary reflector.

In some variations, n is 3. The resulting beams may be 120 degrees off from each other (e.g., equally spaced), or in some variations spaced differently relative to each other (e.g., two and 90 degrees apart from each other and 180 degrees apart from the third, etc.). In some variations, n is four, and the beams are, e.g., 90 degrees from each other. In general, n may be any integer greater than 3 (e.g., 3, 4, 5, 6, 7, 8, 9, 10, etc.).

In general, the shape of the patterned antenna radiating emitter may be any appropriate shape. The shape is generally planar in a central region, with edge regions folded downward. The patterned antenna region may include cut-out regions at the edges and/or in the central (planar) region. In some variations the patterned antenna radiating emitter has a generally triangular, rectangular, hexagonal, circular, etc. shape. For example, the shape of the patterned antenna radiating emitter may be generally triangular shape. As mentioned, the central region (between the bent edges) may be flat or substantially flat.

For example, a patterned antenna radiating emitter may comprise a flat central surface with one or more edges folded down away from a central plane of the patterned antenna radiating emitter. The n antenna input feeds may be directly coupled to n edge regions of the patterned antenna radiating emitter. The patterned antenna radiating emitter may be formed of a single sheet of metal.

In some variations the patterned antenna radiating emitter includes a cut-out region (e.g., hole, opening, passage, etc.) through which a structure may pass, such as a lightpipe, LED, or the like. The cut-out region may be in the center of the patterned antenna radiating emitter. For example, a patterned antenna radiating emitter may include a central opening for passing a light port. Thus, in general, the apparatus may include a lightpipe passing through the patterned antenna radiating emitter.

In some variations the apparatus, and the patterned antenna radiating emitter in particular, is adapted (e.g., the patterned antenna radiating emitter is sized) to operate in both a 5 GHz and a 2 GHz regime. For example, the patterned antenna radiating emitter may have an emitting surface having an average diameter of between about 5 cm and 12 cm. Because the emitting surface (e.g., the flat/planar central surface) may be irregularly shaped, including non-circular, triangular, or asymmetrically shaped, the diameter may refer to the maximum or average diameter.

In general, the radio circuitry may be configured to transmit radio frequency (RF) signals so that each of the n antenna input feeds transmits at a different polarization, spectral signal and/or delay.

Thus, described herein are multi-focal-point antenna devices having a single emitter adapted to emit three or more independent beams that may be used as a multiple input, multiple output (MIMO) antenna. For example, such a device may include: a base plate; a unitary patterned antenna radiating emitter positioned above the base plate, wherein the patterned antenna radiating emitter comprises a single sheet of metal having a plurality of cut-out regions along one or more outer edges of the patterned antenna radiating emitter; n antenna input feeds, where n is 3 or more, extending through the base plate to the patterned antenna radiating emitter, wherein each of the n antenna input feeds are independent and electrically isolated from each other; and a radio circuitry coupled to each of the n antenna input feeds, wherein the radio circuitry is configured to transmit radio frequency (RF) signals so that each of the n antenna input feeds transmits at a different polarization, spectral signal and/or delay, wherein the patterned antenna radiating emitter emits n independent and uncoupled beams.

The base plate may be configured as a ground plate in any of the variations described herein.

In one example, the antenna devices described herein include a triple focal-point antenna device having a single emitter adapted to emit three independent beams, the device comprising: a patterned antenna radiating emitter, wherein the patterned antenna radiating emitter comprises a sheet of metal having a plurality of cut-out regions along one or more outer edges; three antenna input feeds each separately extending to the patterned antenna radiating emitter, wherein each of the three antenna input feeds are independent and electrically isolated from each other; and a radio circuitry coupled to each of the three antenna input feeds, wherein the radio circuitry is configured to transmit radio frequency (RF) signals so that each of the three antenna input feeds transmits at a different polarization, wherein the patterned antenna radiating emitter emits three independent and uncoupled beams. As mentioned above, the patterned antenna radiating emitter may generally have a triangular shape, and may be flat (at least in the central region; the edges may be folded downward). The antenna input feeds may be connected to a portion of the folded-down edge. As mentioned, the patterned antenna radiating emitter may include a central opening for passing a light port, and a lightpipe may pass through the patterned antenna radiating emitter.

For example, the three antenna input feeds may be directly coupled to three edge regions of the patterned antenna radiating emitter. The patterned antenna radiating emitter may be formed of a single sheet of metal. The patterned antenna radiating emitter may be sized to operate in both a 5 GHz and a 2 GHz regime. For example, the patterned antenna radiating emitter may comprise an emitting surface having an average diameter of between about 5 cm and 12 cm.

In some variations the radio circuitry is configured to transmit radio frequency (RF) signals so that each of the three antenna input feeds transmits at a different polarization, spectral signal and/or delay.

In some variations the antenna device is configured as a triple focal-point antenna device having a single emitter adapted to emit three independent beams that may be used as a multiple input, multiple output (MIMO) antenna. For example, a device may include: a base plate; a generally triangular antenna radiating emitter positioned above the base plate, wherein the generally triangular antenna radiating emitter comprises a sheet of metal having a plurality of cut-out regions along one or more outer edges; a light port opening through a central region of the generally triangular antenna radiating emitter; three antenna input feeds extending through the base plate to the triangular antenna radiating emitter, wherein each of the three antenna input feeds are independent and electrically isolated from each other; and a radio circuitry coupled to each of the three antenna input feeds, wherein the radio circuitry is configured to transmit radio frequency (RF) signals so that each of the three antenna input feeds transmits at a different polarization, spectral signal and/or delay, wherein the triangular antenna radiating emitter emits three independent and uncoupled beams.

Also described herein are wireless transmission stations, including wireless broadband access devices. Any of the antennas described herein may be configured as part of a broadband access device and/or wireless access point ("AP"). These apparatuses, including devices and systems, may be wireless broadband access devices that are configurable as a point-to-point or point-to-multipoint stations. In general, the apparatuses described herein may include an antenna and control circuitry configured to control transmission and receipt of broadband information to and from the antenna. The antennas described herein may also be configured and/or referred to as planar antennas. As mentioned, in some variations, an antenna assembly includes a feed horn antenna emitting n signals, where n≥2, a primary reflector, a secondary reflector, and a collector. Some of the antennas described herein are configure as feed horn antennas. A feed horn antenna may have a waveguide that interposes a horn and a radiator configured to emit n beams, where each beam can comprise a signal. The primary reflector has n regions, each region directing electric energy waves corresponding uniquely to one of the n signals, each region having a parabolic surface. The secondary reflector may have n regions, each region directing electric energy waves corresponding uniquely to one of the n signals toward its corresponding region of the primary reflector, each region having a hyperbolic surface. The collector may absorbs only a portion of the electric energy waves directed toward the secondary reflector, the portion of the waves consists of only those waves which may otherwise reflect back to the feed horn antenna.

As mentioned, any of the antenna assemblies described herein may be configured to direct the emitted beams (rather than acting as omnidirectional or semi-omnidirectional). Thus, any of these examples may include at least one reflector, though in particular variations including two (or more) reflectors are described.

For example, an antenna assembly may include: a primary reflector having a concave reflecting surface configured to direct electromagnetic energy; a secondary reflector within the primary reflector having a convex reflecting surface configured to direct electromagnetic energy toward the primary reflector; a primary feed having a patterned emitting surface; two or more (e.g., three) antenna input feeds each connected to the patterned antenna emitting surface of the primary feed; and two or more (e.g., three) connectors exposed on an external surface of the antenna assembly wherein each connector is configured to couple to one of the two or more antenna input feeds and configured to transmit radio frequency (RF) signals at a different polarization to each of the antenna input feeds.

In general, the connectors may be antenna input connectors and may couple to a separate radio device or (in some variations) an integrated radio device having radio circuitry so that the connectors connect the radio circuit to each of the antenna input feeds and to transmit radio frequency (RF) signals at a different polarization to each of the antenna input feeds. The connectors may be on an outer surface (e.g., of the housing connected to or continuous with the primary reflector), or they may be covered (e.g., by a door, housing, etc.) that protects them from the elements. They may generally be accessed by an installer for connecting the radio device to the antenna. In some variations the antenna assembly includes the radio device, which may be integrated with the antenna assembly or attachable/removable from it.

An antenna assembly may include: a primary reflector having a concave reflecting surface configured to direct electromagnetic energy; a secondary reflector within the primary reflector having a convex reflecting surface configured to direct electromagnetic energy toward the primary reflector; a primary feed having a patterned emitting surface; a first radome extending across the concave reflecting surface of the primary reflector; a second radome having a curved surface and extending within the concave reflecting surface of the primary reflector from an outer edge of the concave reflecting surface to the secondary reflector; three or more antenna input feeds each connected to the patterned antenna emitting surface of the primary feed; and three or more connectors exposed on an external surface of the antenna assembly wherein each connector is configured to couple to one of the three or more antenna input feeds and configured to transmit radio frequency (RF) signals at a different polarization to each of the antenna input feeds. The radio assembly may also include a radio circuit coupled to each of the three or more antenna input feeds (through the connectors) and configured to transmit radio frequency (RF) signals at a different polarization to each of the antenna input feeds.

For example, an antenna assembly may include: a primary reflector having a concave reflecting surface configured to direct electromagnetic energy; a secondary reflector within the primary reflector having a convex reflecting surface configured to direct electromagnetic energy toward the primary reflector; a primary feed having a patterned emitting surface; and three or more antenna input feeds each connected to the patterned antenna emitting surface of the primary feed, wherein each of the three or more antenna input feeds are independent and electrically isolated from each other; and radio circuitry coupled to each of the three or more antenna input feeds and configured to transmit radio frequency (RF) signals at a different polarization to each of the antenna input feeds, wherein the patterned emitting surface of the primary feed emits a separate beam corresponding to each of the different polarizations, and wherein each of the beams reflect from the secondary reflector onto a different portion of the primary reflector.

In any of these examples, the antenna assembly may also include a shaped radome across the primary reflector that acts as a lens so that the phase front of the emitted RF signals is more uniform. For example, any of these apparatuses may include a first radome extending across the concave reflecting surface of the primary reflector and a second radome having a curved surface and extending within the concave reflecting surface of the primary reflector from an outer edge of the concave reflecting surface to the secondary reflector.

Any of these antenna assemblies may include a feed horn surrounding the primary feed.

As mentioned above, the primary reflector may be parabolic reflector, e.g., may have a parabolic interior surface. This interior surface may form a cavity. The secondary reflector may be a reflective hyperbolic exterior surface (e.g., having a convex outer surface). The secondary reflector may be supported within the cavity formed by the primary reflector by one or more supports, and/or it may be supported on (and/or integrated with) a shaped radome covering all or part of the opening or mouth formed by the concave inner surface of the primary reflector. For example, the secondary reflector (which may also be referred to as a convex reflector) may be connected to a secondary radome that is within the opening formed by the concave primary reflector. In any of the variations described herein the secondary radome may be shaped so that signals emitted from the antenna assembly to have a uniform phase front. Although this lensing radome may be used in conjunction with a primary radome (e.g., an outer radome covering the opening of the primary reflector), it may be used alone, without any other (e.g., "primary") radome.

In general, the first reflector, second reflector and primary feed may be configured so that radio frequency signals at different polarizations are emitted from different regions of the primary reflector. Differently polarized signals are sent to the patterned emitting surface from different (and independent antenna feeds), and emitted from the patterned emitting surface at different locations so that they hit the secondary reflector (located opposite the patterned emitting surface) at different regions. These different regions may overlap or be non-overlapping. Once reflected from specific (overlapping or non-overlapping) sub-regions of the secondary reflector, the differently polarized RF signals may be reflected from different sub-regions (overlapping or non-overlapping) of the primary reflector. Thus, the first reflector, second reflector and primary feed may be configured so that radio frequency signals at different polarizations are emitted in the same direction from the antenna assembly but from different regions of the primary reflector.

Also described herein are methods for transmitting RF signals using any of the apparatuses described herein. For example, described herein are methods of transmitting radio frequency (RF) signals from an antenna assembly including: transmitting a first RF signal at a first polarization from an emitting surface of a primary feed towards a secondary reflector, reflecting the first RF signal from the secondary reflector to a first portion of a primary reflector, reflecting the first RF signal from the primary reflector to emit the first RF signal from the antenna assembly in a first direction; and transmitting a second RF signal at a second polarization from the emitting surface of the primary feed towards the secondary reflector, reflecting the second RF signal from the secondary reflector to a second portion of the primary reflector, reflecting the second RF signal from the primary reflector to emit the second RF signal from the antenna assembly in the first direction.

Any of these methods may also include transmitting a third RF signal at a third polarization from the emitting surface of the primary feed towards the secondary reflector, reflecting the third RF signal from the secondary reflector to a third portion of the primary reflector, reflecting the third RF signal from the primary reflector to emit the third RF signal from the antenna assembly in the first direction.

For example, a method of transmitting radio frequency (RF) signals from an antenna assembly may include: transmitting a first RF signal at a first polarization from an emitting surface of a primary feed towards a secondary reflector, reflecting the first RF signal from the secondary reflector to a first portion of a primary reflector, reflecting the first RF signal from the primary reflector to emit the first RF signal from the antenna assembly in a first direction; transmitting a second RF signal at a second polarization from the emitting surface of the primary feed towards the secondary reflector, reflecting the second RF signal from the secondary reflector to a second portion of the primary reflector, reflecting the second RF signal from the primary reflector to emit the second RF signal from the antenna assembly in the first direction; transmitting a third RF signal at a third polarization from the emitting surface of the primary feed towards the secondary reflector, reflecting the third RF signal from the secondary reflector to a third portion of the primary reflector, reflecting the third RF signal from the primary reflector to emit the third RF signal from the antenna assembly in the first direction; and passing the first, second and third RF signals through a curved radome to adjust the phase front of the first, second and third RF signals so that they are uniform.

As mentioned, any of these methods may include passing the first and second RF signals through a shaped radome within (including over) a parabolic cavity formed by the primary reflector. The shaped radome may operate as a lens, so that RF signals transmitted through the radome from the device have a more uniform phase front. For example, the method may include passing the first and second RF signals through a shaped radome within a parabolic cavity formed by the primary reflector and through a flat radome covering the parabolic cavity of the primary reflector. Thus, any of these methods may include passing the first and second RF signals through a shaped radome so that first and second RF signals emitted from the antenna assembly have a uniform phase front.

Any of these methods may also include transmitting the first RF signal from a radio circuit through a first antenna input feed to the emitting surface of the primary feed and transmitting the second RF signal from the radio circuit to a second antenna input feed to the emitting surface of the primary feed.

As mentioned, the first portion of a primary reflector and the second portion of the primary reflector may comprise different but overlapping regions; alternatively, the first portion of a primary reflector and the second portion of the primary reflector may comprise non-overlapping regions.

Although the majority of the apparatuses described herein include a single primary feed with a single patterned antenna emitting surface, in some variations a plurality of antenna emitting surfaces may be used, particularly with the configuration of the dual reflectors described herein. For example, an array antenna may be used. An array antenna may also be referred to as a patch array antenna or patch antenna, and may be formed of a plurality of antenna radiating elements each having a radiating surface. The antenna arrays may also be configured and/or referred to as planar antennas or planar array antennas.

For example, in one variation an antenna assembly may include a primary reflector directing electric energy waves, a secondary reflector directing electric energy waves toward the primary reflector, a feed horn antenna directing electric energy waves toward the secondary reflector. The feed horn antenna may include a shorted patch antenna array positioned at an opening to the feed horn. The apparatus may include a collector absorbs only a portion of the electric energy waves directed toward the secondary reflector. The portion of the waves consists of only those waves which may otherwise reflect back to the feed horn antenna. The collector may be an orthogonal mode transducer probe.

Also described herein are apparatuses (e.g., compact radio frequency antenna apparatuses) having a lightpipe. The apparatus may be particularly compact because the lightpipe may be configured to pass through the primary feed. Although the primary feed is configured to be relatively large (e.g., a unitary primary feed as described herein, between 1-8 inches in average diameter), the primary feed may have an emitting surface that includes a hole or aperture through which the lightpipe may pass. The light from the lightpipe may be used to provide a visual indicator of the status of the device, such as on/off, transmitting/receiving, quality of signal connection(s), etc.

For example, a compact RF antenna apparatus having a lightpipe may include: a base of printed circuit material including a light emitting diode (LED); a primary feed held above the PCB comprising a flat emitting surface with an aperture therethrough; a lightpipe extending from the LED though the aperture of the primary feed, the lightpipe comprising a stem portion coupled to an emission portion of the LED and extending through the aperture to a cap and an illumination region on or around the cap; and a radio circuitry on the PCB and coupled to the primary feed, wherein the radio circuitry is configured to transmit RF signals to and from the primary feed.

Thus, a compact radio frequency (RF) antenna device having a lightpipe, the device comprising: a base of printed circuit material including a light emitting diode (LED); a primary feed comprising a sheet of metal having a flat emitting surface with an aperture through the emitting surface, wherein the primary feed is separated from the base by a plurality of antenna input feeds extending from the PCB; a lightpipe extending from the LED though the aperture of the primary feed, the lightpipe comprising a stem portion coupled to an emission portion of the LED and extending through the aperture to a cap comprising a translucent illumination region; and a radio circuitry on the PCB and coupled to the primary feed through the plurality of antenna input feeds, wherein the radio circuitry is configured to transmit RF signals to and from the primary feed through the plurality of antenna input feeds.

In general, any of these antenna devices may be configured as an access point. These apparatus may include a housing, e.g., a shallow dish-shaped housing enclosing the PCB, primary feed and radio circuitry. The apparatus may also include a cover, which may mate with the cap region of the lightpipe, or may include a translucent or transparent region allowing light to pass from the lightpipe through the cover.

Any of the primary feeds described herein may be used. For example, the primary feed may be connected (e.g., directly connected) to the PCB by grounding pins or legs and at least one feed point.

The stem of the lighpipe may be pyramidal or conical. The stem portion of the lightpipe may be funnel-shaped, e.g., having a conical mouth at the end of the stem. The mouth may be larger perimeter than the stem. The lightpipe may include a circular mouth distal to the LED and stem; in some variations the lightpipe includes a square mouth. The mouth of the lightpipe may be textured to diffuse light from the LED.

The cap of the lightpipe may be partially or completely translucent, e.g., it may include a translucent ring. In general, the cap may be configured to cover the mouth of the lightpipe. The stem of the lightpipe may encompass the LED. The lightpipe may include comprises a polycarbonate material. The lightpipe may be oriented perpendicular to the PCB.

BRIEF DESCRIPTION OF THE DRAWINGS

FIG. 1A shows an isometric view with the (outer or primary) radome cover. FIG. 1B shows a back view. FIG. 1C shows a bottom view. FIG. 1D shows a left view. FIG. 1E shows a right view. FIG. 1F shows a top view.

FIG. 2A shows an isometric view. FIG. 2B shows a cross-sectional view. FIG. 2C shows a top view. FIG. 2D shows a back view. FIG. 2E shows a left view. FIG. 2F shows a right view.

FIG. 12A includes a horn element that is not shown in FIG. 12B.

FIG. 16 shows the wireless access point of FIG. 15A with the enclosure and lightpipe cover removed.

FIG. 17A is a cross-sectional view along the x-z axis.

FIG. 17B is a cross-sectional view along the x-y axis.

FIG. 18 is a top view illustrating the emitter element (a generally triangular antenna radiating emitter) and radio circuitry of the wireless access point of FIG. 15A.

FIG. 19A is a cross-sectional perspective view. FIG. 19B is a top view of the lightpipe.

FIG. 20A is a cross-sectional perspective view. FIG. 20B is a top view of the lightpipe.

FIG. 23A shows a front view. FIG. 23B is a back view (showing four connectors for connecting to a radio device including an RF radio device). FIG. 23C is another view of the back of the antenna assembly of FIG. 23A, showing the mounting and connectors.

FIGS. 23D and 23E show view of the inside of the primary parabolic reflector of the device of FIG. 23A, showing the inner reflective surface of the primary parabolic reflector (the secondary parabolic reflector and radome have been removed in these figures). In FIG. 23A a covering is shown covering the primary feed. This covering (which is also a radome) is shown removed in FIG. 23E, exposing the primary feed, and particularly the emitting surface (patterned antenna radiating emitter).

FIG. 23F is a cross-section through the antenna apparatus of FIG. 23A, showing the primary reflector and within the primary reflector a second reflector opposite the primary feed (comprising a patterned antenna radiating emitter) having four independent antenna feed inputs (two are visible) connected to the single patterned antenna radiating emitter.

FIG. 24A includes a horn element that shown missing in FIG. 24B.

DETAILED DESCRIPTION

Figure 1A:
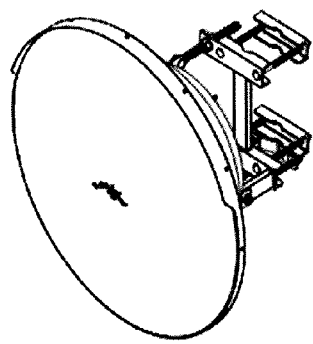
FIGS. 1A, 1B, 1C, 1D, 1E, and 1F show one variation of a conical shaped antenna assembly.

In general, described herein are wireless antenna assemblies, including transmission stations, which may include a radio and antenna (e.g. combined radio and antenna), for providing wireless broadband access configured for outdoor and/or indoor use to provide point-to-point or point-to-multipoint communication. Also described herein are antennas that may be used as part of a wireless transmission station.

A wireless transmission station apparatuses, including devices and/or apparatuses, may include a closed housing that may be sealed or otherwise made weatherproof/waterproof, an integrated bracket mount forming part of the housing, and an internal space housing one or more reflectors, and an emitter (e.g., a primary feed having a single emitter surface that receives input from multiple antenna feeds each carrying a differently polarized RF signal. In some variations, the device also includes a bracket the engages (and may be locked/secured) to the bracket mount on the rear of the housing to secure the device to pole, stand, or any other mount. In some variations the bracket and bracket mount are ball-and-docket brackets/mounts that permit adjustment of the position of the housing and thereby the antenna. In some variations the bracket (e.g., a socket) is configured as a fixed bracket, i.e., the bracket is in a permanently fixed position (non-moveable) relative to the housing or is formed as part of the housing. The bracket mount and bracket may be configured to cooperate to allow the angle of the device (e.g., the altitudinal angle of the device relative to the pole or mount to which it has been attached) to be selected. Once selected, the angle may be fixed. In some variations, the angle may be permanently fixed, while in other variations the angle may be later adjusted. The bracket may include a lock or locking element that may be fixed and/or released to allow adjustment. Although different examples of apparatuses (including devices and systems) configured as wireless transmission stations and/or antenna are described and illustrated, any of the features of one example may be combined with features of any of the other examples. For example, any of the various housing configurations may be used with any of the mount sub-systems described herein. The following terms and phrases should be read in their most general form. The general meaning of each of these terms or phrases is illustrative but not limiting.

The terms "antenna", "antenna system", "antenna assembly" and the like, generally refer to any device that is designed to transmit or receive electromagnetic radiation. In other words, antennas convert electromagnetic radiation into electrical currents and vice versa. An antenna may include an arrangement of conductor(s) that generate a radiating electromagnetic field in response to an applied alternating voltage and the associated alternating electric current, or can be placed in an electromagnetic field so that the field will induce an alternating current in the antenna and a voltage between its terminals.

The phrase "wireless communication system" generally refers to a coupling of EMF's (electromagnetic fields) between a sender and a receiver. For example and without limitation, many wireless communication systems operate with senders and receivers using modulation onto carrier frequencies of between about 2.4 GHz and about 5 GHz. However, in the context of this disclosure, there is no particular reason why there should be any such limitation. For example and without limitation, wireless communication systems might operate, at least in part, with vastly distinct EMF frequencies, e.g. ELF (extremely low frequencies) or using light (e.g., lasers), as is sometimes used for communication with satellites or spacecraft.

The phrase "access point", the term "AP", and the like, generally refer to any devices capable of operation within a wireless communication system, in which at least some of their communication is potentially with wireless stations. For example, an "AP" might refer to a device capable of wireless communication with wireless stations, capable of wire-line or wireless communication with other AP's, and capable of wire-line or wireless communication with a control unit. Additionally, some examples AP's might communicate with devices external to the wireless communication system (e.g., an extranet, internet, or intranet), using an L2/L3 network. However, in the context of this disclosure, there is no particular reason why there should be any such limitation. For example, one or more AP's might communicate wirelessly, while zero or more AP's might optionally communicate using a wire-line communication link.

The term "filter", and the like, generally refers to signal manipulation techniques, whether analog, digital, or otherwise, in which signals modulated onto distinct carrier frequencies can be separated, with the effect that those signals can be individually processed.

By way of example, in systems in which frequencies both in the approximately 2.4 GHz range and the approximately 5 GHz range are concurrently used, it might occur that a single band-pass, high-pass, or low-pass filter for the approximately 2.4 GHz range is sufficient to distinguish the approximately 2.4 GHz range from the approximately 5 GHz range, but that such a single band-pass, high-pass, or low-pass filter has drawbacks in distinguishing each particular channel within the approximately 2.4 GHz range or has drawbacks in distinguishing each particular channel within the approximately 5 GHz range. In such cases, a 1st set of signal filters might be used to distinguish those channels collectively within the approximately 2.4 GHz range from those channels collectively within the approximately 5 GHz range. A 2nd set of signal filters might be used to separately distinguish individual channels within the approximately 2.4 GHz range, while a 3rd set of signal filters might be used to separately distinguish individual channels within the approximately 5 GHz range.

The phrase "isolation technique", the term "isolate", and the like, generally refer to any device or technique involving reducing the amount of noise perceived on a 1st channel when signals are concurrently communicated on a 2nd channel. This is sometimes referred to herein as "crosstalk", "interference", or "noise".

The phrase "null region", the term "null", and the like, generally refer to regions in which an operating antenna (or antenna part) has relatively little EMF effect on those particular regions. This has the effect that EMF radiation emitted or received within those regions are often relatively unaffected by EMF radiation emitted or received within other regions of the operating antenna (or antenna part).

The term "radio", and the like, generally refer to (1) devices capable of wireless communication while concurrently using multiple antennae, frequencies, or some other combination or conjunction of techniques, or (2) techniques involving wireless communication while concurrently using multiple antennae, frequencies, or some other combination or conjunction of techniques.

The terms "polarization", and the like, generally refers to signals having a selected polarization. Differently polarized signals include signal that are phase shifted relative to each other by some amount, e.g., horizontal polarization, vertical polarization, right circular polarization, left circular polarization. The term "orthogonal" generally refers to relative a lack of interaction between a 1st signal and a 2nd signal, in cases in which that 1st signal and 2nd signal are polarized. For example and without limitation, a 1st EMF signal having horizontal polarization should have relatively little interaction with a 2nd EMF signal having vertical polarization.

The phrase "wireless station" (WS), "mobile station" (MS), and the like, generally refer to devices capable of operation within a wireless communication system, in which at least some of their communication potentially uses wireless techniques.

The phrase "patch antenna" or "microstrip antenna" generally refers to an antenna formed by suspending a single metal patch over a ground plane. The assembly may be contained inside a plastic radome, which protects the antenna structure from damage. A patch antenna is often constructed on a dielectric substrate to provide for electrical isolation.

The phrase "dual polarized" generally refers to antennas or systems formed to radiate electromagnetic radiation polarized in two modes. Generally the two modes are horizontal radiation and vertical radiation. Similarly, multiple polarizations may refer to systems configured to emit RF signals at more than 2 (e.g., 3 or more) polarizations.

The phrase "patch" generally refers to a metal patch suspended over a ground plane. Patches are used in the construction of patch antennas and often are operable to provide for radiation or impedance matching of antennas.

In some variations, described herein are apparatuses including a single primary feed that includes a single continuous emitting/radiating surface that receives input from a plurality of antenna feeds transmitting independent RF signals at different polarizations. These differently polarized signals may each be emitted from the emitter surface in different beams. In some variations the antenna assemblies include two or more reflectors for directing the different beams emitted in a particular direction, having a relatively uniform phase front. The primary feed, first (e.g., primary) reflector and second (e.g., secondary) reflector may be arranged so that the different beams reflect off of different portions of the first and second reflectors but are directed in the same direction. The primary reflector may be parabolic and the secondary reflector (typically, but not necessarily) may be within the cavity formed by the primary reflector, opposite from the primary feed.

In general, any of the antenna assemblies (which may be referred to as antenna apparatuses and include antenna system and antenna devices) are particularly useful for MIMO, as they may provide different paths for the signals having different polarizations.

In some variations a primary feed with a single emitting surface and multiple (e.g., 3 or more) antenna feeds may be used with a radio circuit supplying RF signals at different polarizations as an omnidirectional, e.g., 360 degree, (or semi-omnidirectional, e.g., between 180 and 360 degrees, between 225 and 360 degrees, between 270 degree and 360 degrees, etc.).

For example, described herein are wireless transmission stations that may include radio circuitry and one or more antennae (e.g. combined radio and antenna) for providing wireless broadband access configured for outdoor and/or indoor use to provide point-to-point or point-to-multipoint communication. In particular, described herein are multi-focal-point antenna devices having a single emitter adapted to emit three or more independent beams. The multi-focal point antenna may include a single patterned antenna radiating emitter and n antenna input feeds that are each independent and electrically isolated from each other.

A wireless transmission station apparatus may include a closed housing that may be sealed or otherwise made weatherproof/waterproof, an integrated bracket mount forming part of the housing, and an internal space housing one or more antennas. The device may also include a bracket the engages (and may be locked/secured) to the bracket mount on the rear of the housing to secure the device to pole, stand, or any other mount. A bracket and bracket mount may be ball-and-docket brackets/mounts that permit adjustment of the position of the housing and thereby the antenna. The bracket (e.g., a socket) may be configured as a fixed bracket, i.e., the bracket may be in a permanently fixed position (non-moveable) relative to the housing or may be formed as part of the housing. The bracket mount and bracket may be configured to cooperate to allow the angle of the device (e.g., the altitudinal angle of the device relative to the pole or mount to which it has been attached) to be selected. Once selected, the angle may be fixed. The angle may be permanently fixed, or the angle may be later adjusted. The bracket may include a lock or locking element that may be fixed and/or released to allow adjustment. Although different examples of apparatuses (including devices and systems) configured as wireless transmission stations and/or antenna are described and illustrated, any of the features of one example may be combined with features of any of the other examples. For example, any of the various housing configurations may be used with any of the mount sub-systems described herein. The following terms and phrases should be read in their most general form. The general meaning of each of these terms or phrases is illustrative but not limiting.

Figure 1B:
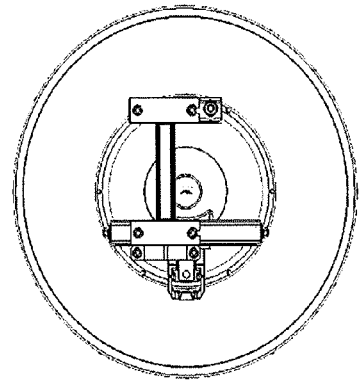
Figure 1D:
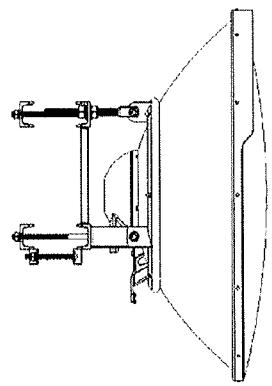
Figure 1C:
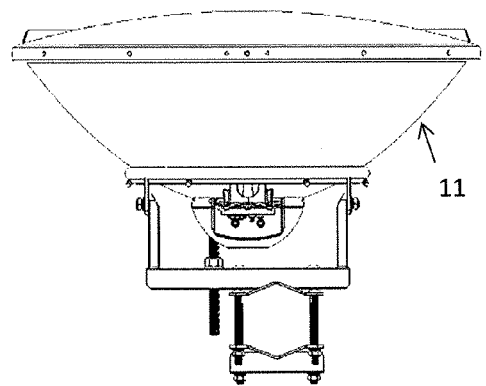
Figure 1E:
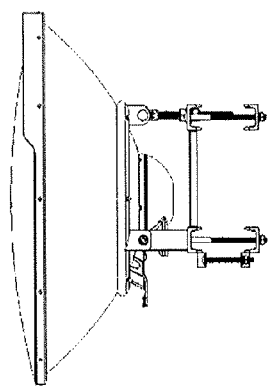
Figure 1F:
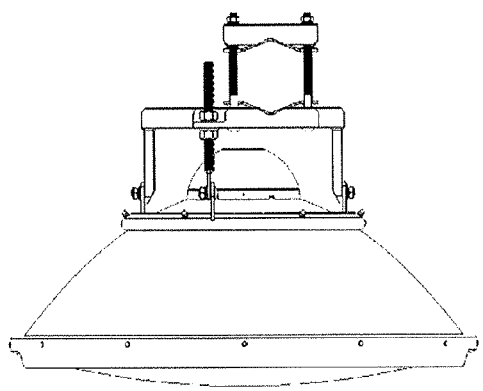

FIGS. 1A-F show one variation of the conical shaped antenna assembly. FIG. 1A shows an isometric view with the radome cover. FIG. 1B shows a back view. FIG. 1C shows a bottom view. FIG. 1D shows a left view. FIG. 1E shows a right view. FIG. 1F shows a top view. The antenna assembly includes a substantially conical (and/or parabolic) primary reflector 11 having a base. A secondary reflector (not visible) is suspended proximate to an antenna positioned at the base. In operation, the vertex end of the conical shaped antenna assembly may be electrically coupled to a final amplifier of a radio transmitter (not shown) such that the apex may function as an antenna feed point or feed area. The antenna may be impedance matched to the amplifier either by constructing the antenna assembly to predetermined dimensions or through an additional circuit (not shown) tuned to the impedance of the transmission system. When the radiator transmitter is transmitting, the antenna may be electrically excited at the frequency of transmission and radiate energy away from the antenna.

Figure 2A:
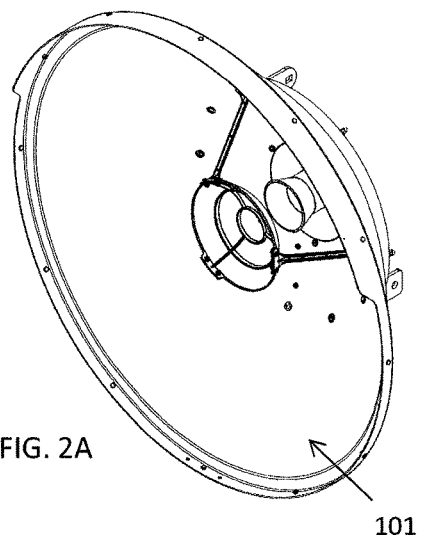
FIGS. 2A, 2B, 2C, 2D, 2E, and 2F shows the front section of the assembly shown in FIG. 1 without the outer radome.
Figure 2B:
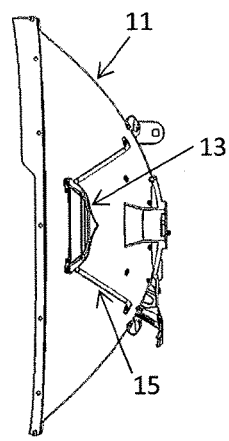
Figure 2D:
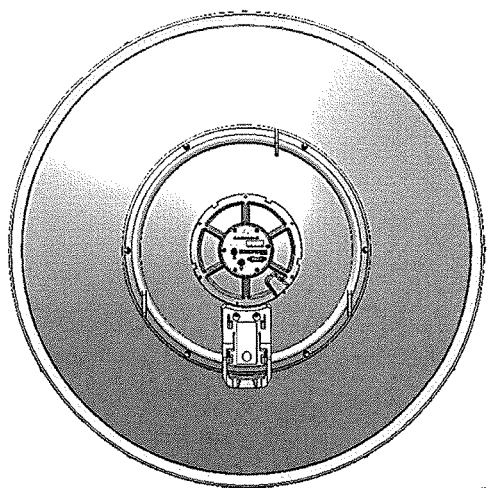
Figure 2C:
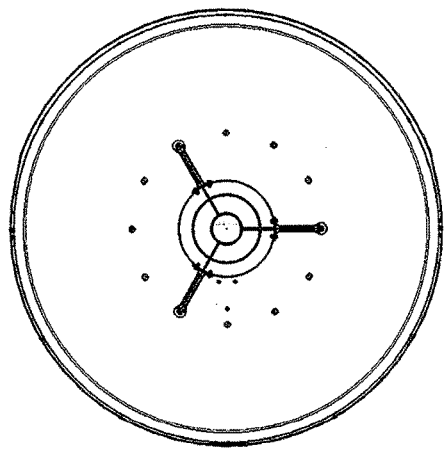
Figure 2E:
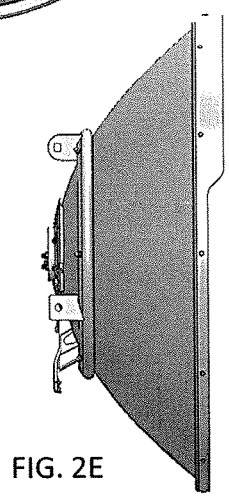
Figure 2F:
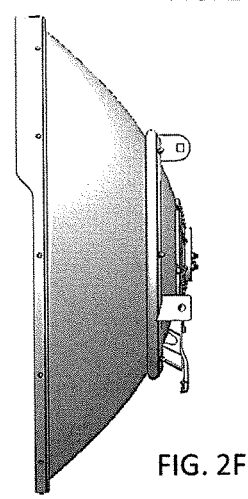

FIGS. 2A-F shows the front section of the assembly shown in FIG. 1 without the radome. FIG. 2A shows an isometric view. FIG. 2B shows a cross-sectional view. FIG. 2C shows a top view. FIG. 2D shows a back view. FIG. 2E shows a left view. FIG. 2F shows a right view. The primary reflector 11 has a parabolic interior surface and a base. A rubber cowl encompasses the outer edge of the primary reflector. A portion of the cowl extends beyond the radome. The radome fits in the upper edge of the primary reflector. The cowl when mated to the radome protects the assembly from environmental conditions such as birds, rain, and sunlight thereby creating a waterproof and weatherproof seal. The primary reflector is preferably made of aluminum. A support structure connects a secondary reflector 13 to the primary reflector in an on-axis configuration. An antenna submount assembly interposes the primary and secondary reflectors such that the secondary reflector presents a reflective hyperbolic surface or convex surface to the antenna submount assembly. A shroud covers the antenna submount assembly.

The supporting structure connects the secondary reflector to the primary reflector. In this variation, the supporting structure 15 includes three vertical shackles, e.g. three plastic arms. The arms are evenly distributed along the perimeter of the secondary reflector.

This variation may operate as a Cassegrain antenna, where a feed antenna is mounted at or behind the surface of the concave main parabolic reflector dish and is aimed at a smaller convex secondary reflector suspended in front of the primary reflector. The beam of radio waves from the feed illuminates the secondary reflector, which reflects it back to the main reflector dish, which reflects it forward again to form the desired beam.

Figure 3A:
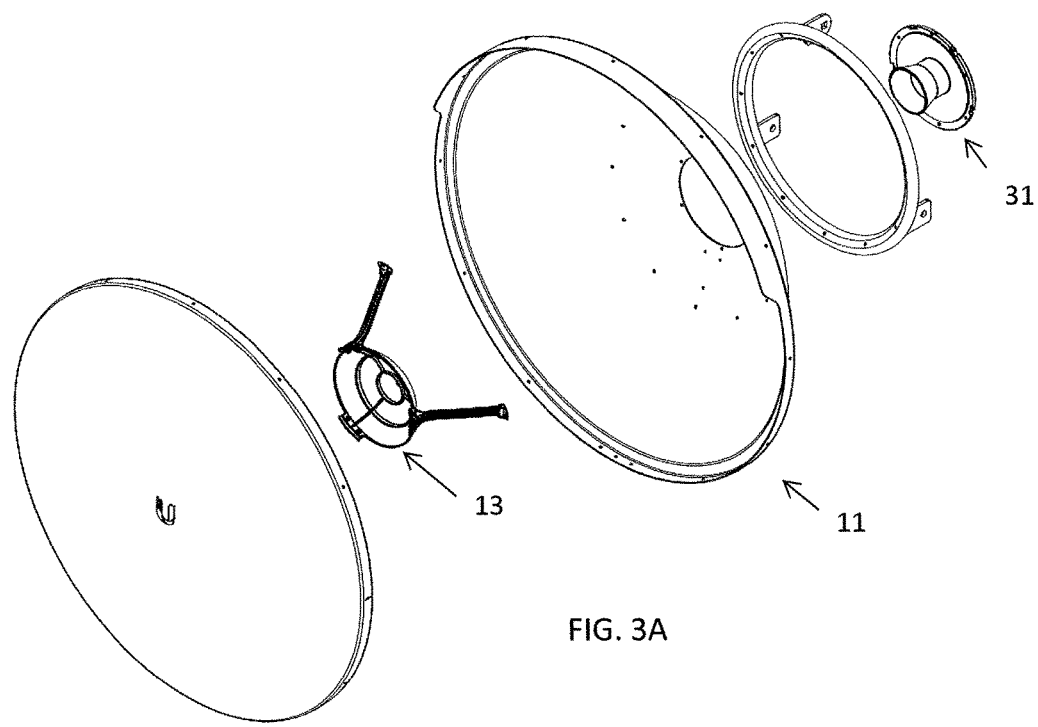
FIGS. 3A and 3B show an exploded view of the assembly shown in FIGS. 1A-1F.
Figure 3B:
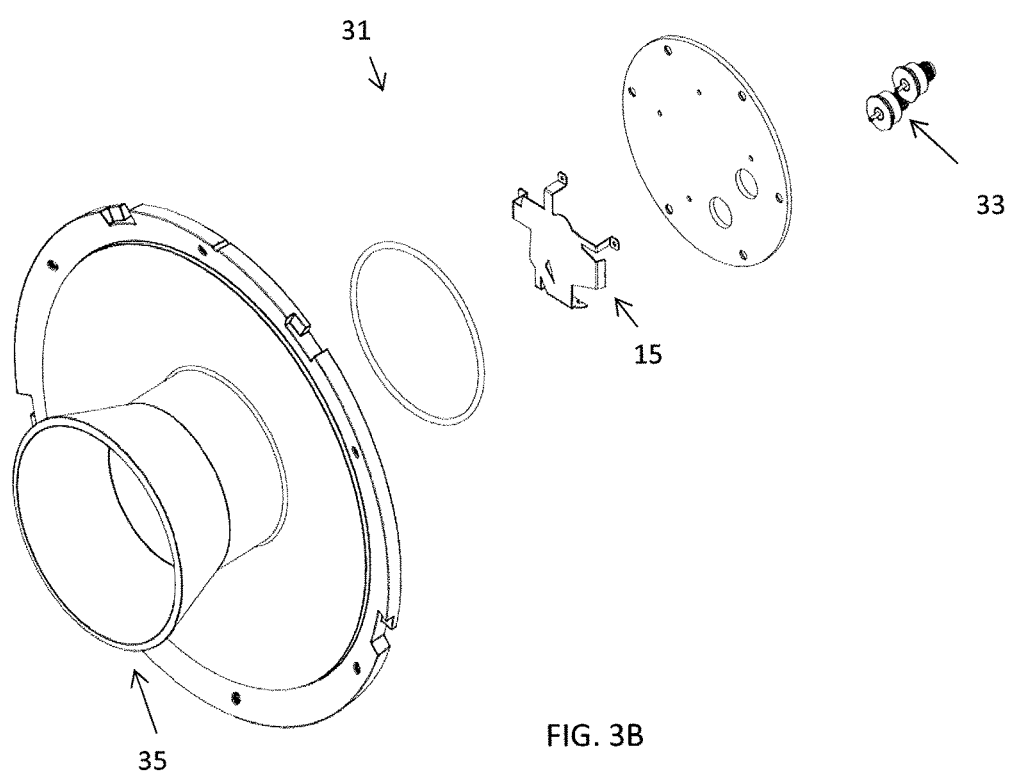

FIG. 3A and FIG. 3B, in concert, show an exploded view of the assembly shown in FIG. 1. FIG. 3B shows an expanded view of the antenna submount assembly 31. The antenna submount assembly attaches behind the secondary reflector. A horn flange 35 is centrally positioned on a base. A feed antenna is secured to a plate. An O-ring interposes the base and the plate. The feed antenna collects the signal from the secondary reflector and directs it to an orthomode transducer (OMT) probe. The OMT probe absorbs the collected signal and conducts it to the connector (not shown). Although in this example, the primary feed is configured to couple to just two antenna feed inputs that each couple to a connector of a pair of connectors 33 (e.g., one for vertical polarization and one for horizontal polarization), as described in greater detail, three or more polarizations may be emitted from a primary feed, and particularly a primary feed 15 having an appropriate pattern of cut-out regions on metal emitter/radiator surface.

This example of an OMT probe may also be referred to as a polarization duplexer. They are typically used to either combine or to separate two orthogonally polarized microwave signal paths. One of the paths forms the uplink, which is transmitted over the same waveguide as the received signal path, or downlink path. OMT probes are used with feed horn antennas to isolate orthogonal polarizations of a signal and to transceive signals to different ports.

Figure 4A:
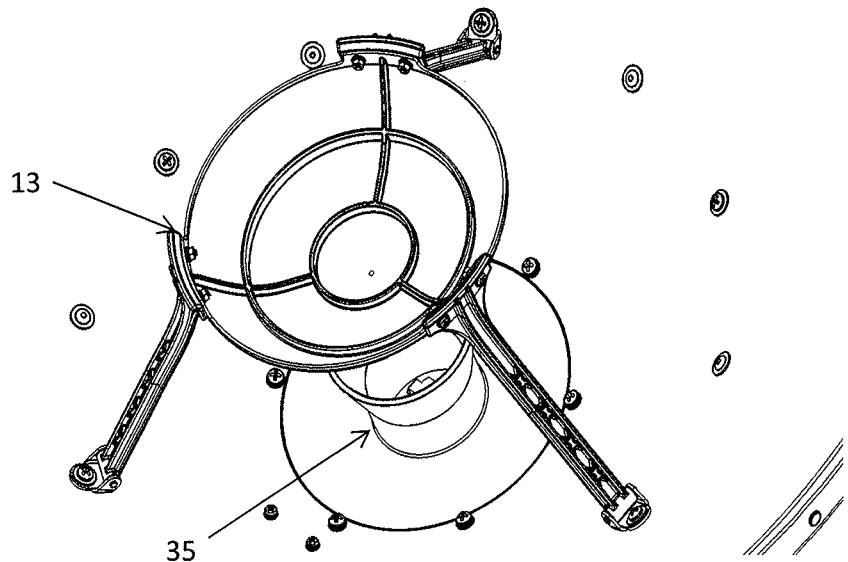
FIGS. 4A and 4B show close-up views of the variations of the secondary reflector shown in FIG. 3A.
Figure 4B:
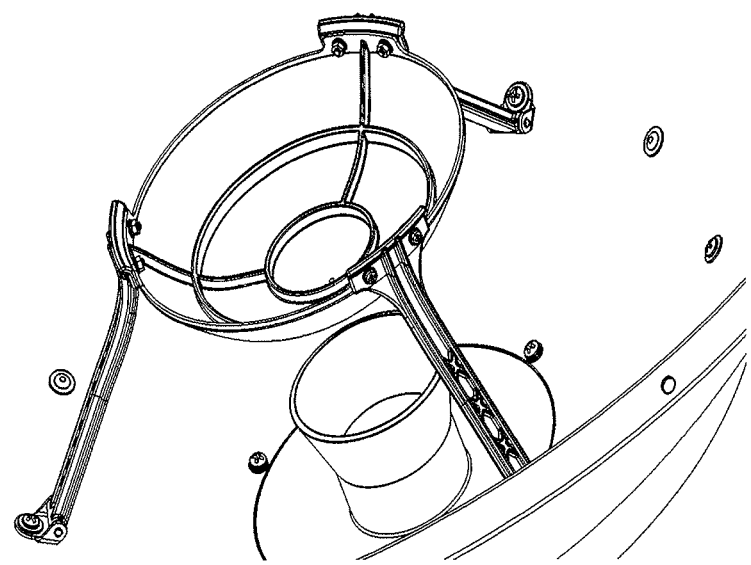

FIG. 4A and FIG. 4B show close-up views of additional examples of the secondary reflector shown in FIG. 3. For both views, the secondary reflector has a parabolic interior surface and a reflective hyperbolic exterior surface. This is an on-axis reflector configuration. The interior surface of the secondary reflector is lined by a concentric support structure. The base of the secondary reflector covers the horn of the feed horn antenna. Alternatively, the interior surface of the secondary reflector may be continuous.

Figure 5:
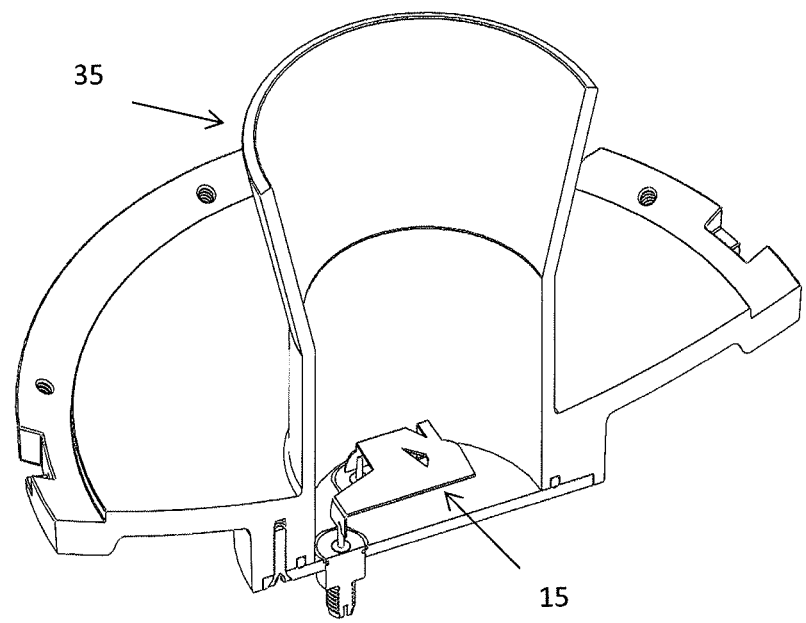
FIG. 5 shows a cross-sectional view of the feed horn antenna shown in FIGS. 1A-1F.

FIG. 5 shows a cross-sectional view of the feed horn antenna shown in FIGS. 1A-1F. The feed horn has a narrow beamwidth/higher gain to focus its radiation on the smaller secondary reflector. The angular width subtends the feed horn typically 10-15 degrees. Typically, the phase center of the horn is placed at the focal point of the secondary reflector. The feed horn includes a waveguide having an unvarying cross-sectional area and a horn that flares outward. The material may be made of metal. The primary feed is seated at the base of the waveguide. Each of the resonant arms (antenna inputs) of the primary feed attaches to the baseplate. The baseplate is attached via screws to the feed horn.

In operation, if a simple open-ended waveguide is used in the antenna, without the horn, the sudden end of the conductive walls may cause an abrupt impedance change at the aperture, from the wave impedance in the waveguide to the impedance of free space. When radio waves travelling through the waveguide hit the opening, this impedance-step reflects a significant fraction of the wave energy back down the guide toward the source, so that not all of the power is radiated. In one variation, to improve performance, the ends of the waveguide may be flared out to form a horn. The taper of the horn changes the impedance gradually along the horn's length. This acts like an impedance matching transformer, allowing most of the wave energy to radiate out the end of the horn into space, with minimal reflection. The taper functions similarly to a tapered transmission line, or an optical medium with a smoothly varying refractive index. In addition, the wide aperture of the horn projects the waves in a narrow beam.

The surface area of the horn that gives minimum reflected power is an exponential taper. Conical and pyramidal horns may be used because they have straight sides and are easier to design and fabricate.

Figure 6:
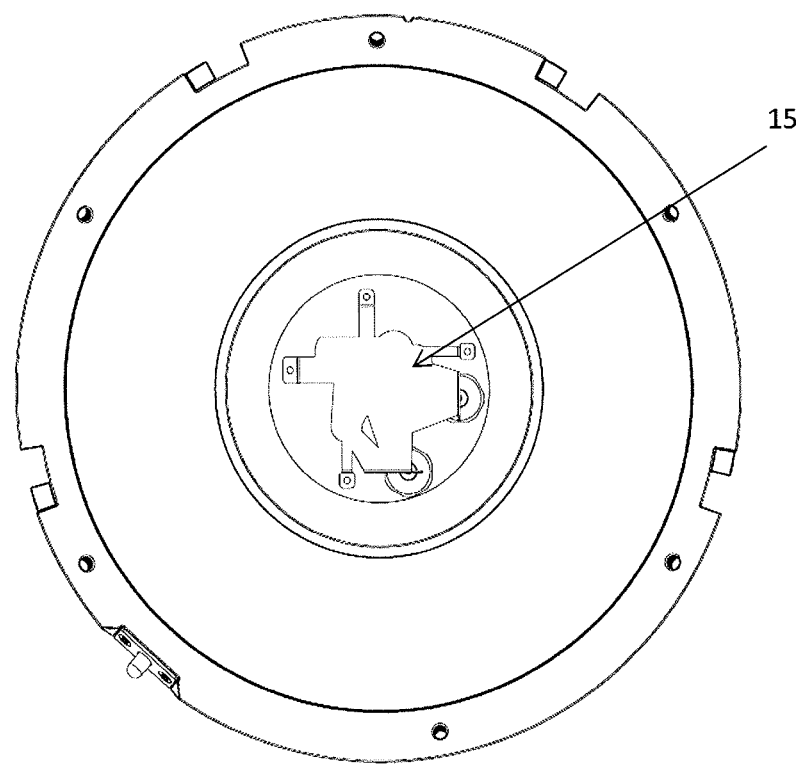
FIG. 6 shows a close-up top-down view of the radiator shown in FIG. 5.
Figure 7A:
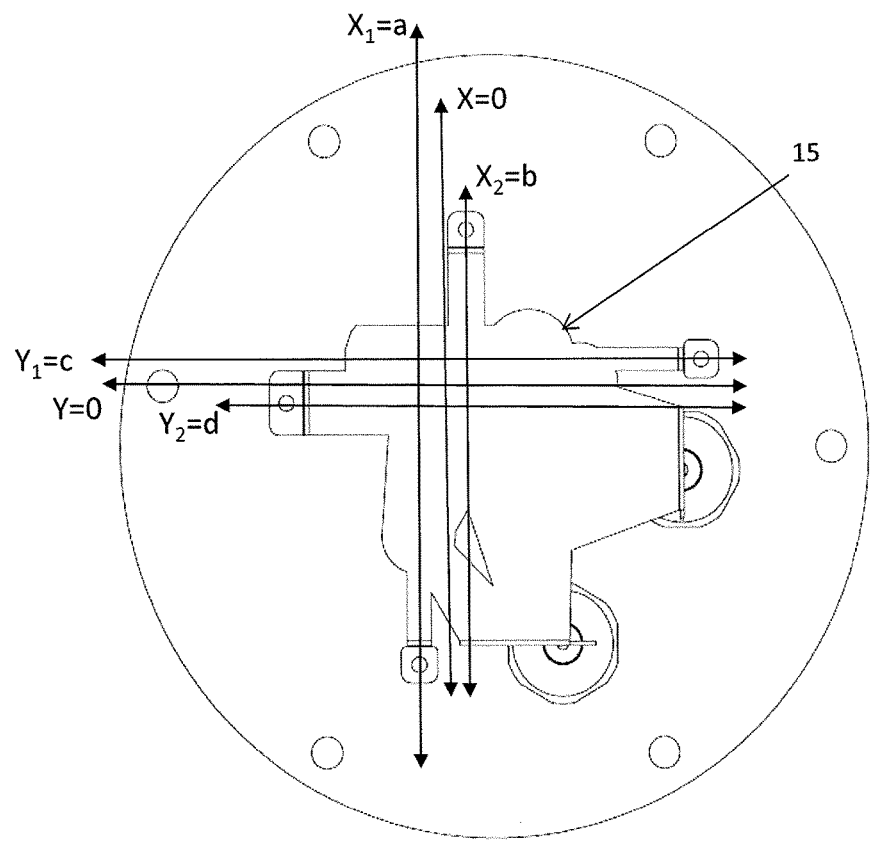
FIGS. 7A and 7B show a close-up expanded perspective of the variation of the antenna primary feed shown in FIG. 5.
Figure 7B:
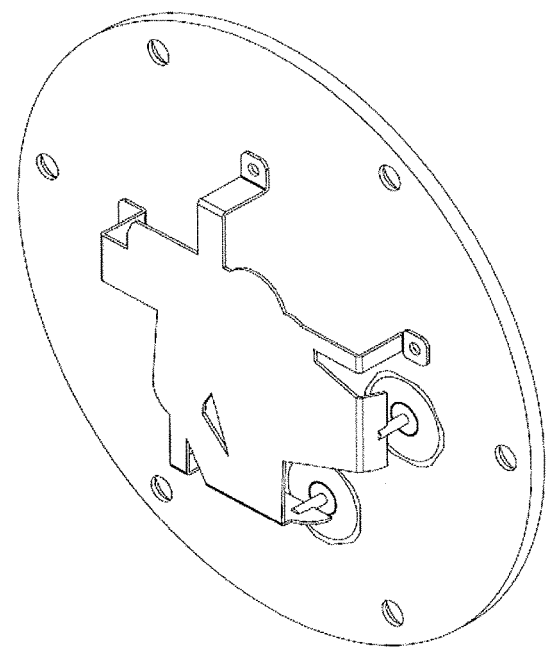

FIG. 6 shows a close-up top-down view of the radiator shown in FIG. 5. FIGS. 7A and 7B show a close-up expanded perspective of the antenna shown in FIG. 5. In this variation, the radiator is a cross-shaped shorted primary feed 15. The primary feed is described with respect to a Cartesian coordinate system with axis labels x and y. The x and y axes are perpendicular with respect to one another.

In the illustrative example, there are two x-axial resonant arms, each having a center line parallel to the x-axis. The function describing the first x-axial center line is $X1=a$, where a is a constant. The function describing the second x-axial center line is $X2=b$, where b is a constant. Similarly, there are two y-axial resonant arms, each having a center line parallel to the y-axis. The function describing the first y-axial center line is $Y1=c$, where c is a constant. The function describing the second y-axial center line is $Y2=d$, where d is a constant. In this example, the x-axis is positioned between first and the second x-axial center lines. The y-axis is positioned between the first and the second y-axial center lines. The origin is positioned at the intersection of the x-axis and the y-axis. For each pair of axial resonant arms, the arms are opposing, such that a shorting wall to ground is positioned at the distal ends, e.g. away from the origin. The arms are offset such that the spacing between their corresponding center lines is $\lambda/2$ where $\lambda$ is the wavelength of the antenna. Thus, $|X_1-X_2|=|Y_1-Y_2|=\lambda/2$. The antenna is further tuned by the shape of the patch in the x, y, and z axes.

A slot is positioned within the patch. When the patch is driven as an antenna by a driving frequency, the slot radiates electromagnetic waves. The shape and size of the slot, as well as the driving frequency, determine the radiation distribution pattern.

The radiator is a patch made of a metal sheet mounted above a ground plane using dielectric spacers (not shown). The radiator may be formed from an electrically conductive material of the type conventionally found in antenna radiators such as aluminum, copper and other malleable metals. The radiator may be stamped from a single piece of electrically conductive material.

An illustrative example of a method for operating the aforementioned antenna assemblies is described herein. In transmitting mode, a feed horn directs electric energy waves from a single substrate primary feed toward a secondary reflector. The feed horn includes a waveguide connected to a horn. The primary feed (emitting surface) is positioned at the opening to the waveguide. The secondary reflector directs the electric energy waves toward a primary reflector. In receiving mode, the primary reflector receives reflected electric energy waves and directs the waves towards the secondary reflector. A collector absorbs only a portion of the reflected electric energy waves, the portion of the waves consists of only those waves which may otherwise reflect back to the primary feed.

Another variation of an antenna assembly is shown in FIGS. 8A-8G. In this example, the antenna assembly includes three inputs for three differently polarized RF signals, each of which may be emitted by the same primary feed toward a secondary reflector and a primary reflector for transmission from the assembly in the same direction with a uniform or near-uniform phase front.

Figure 8A:
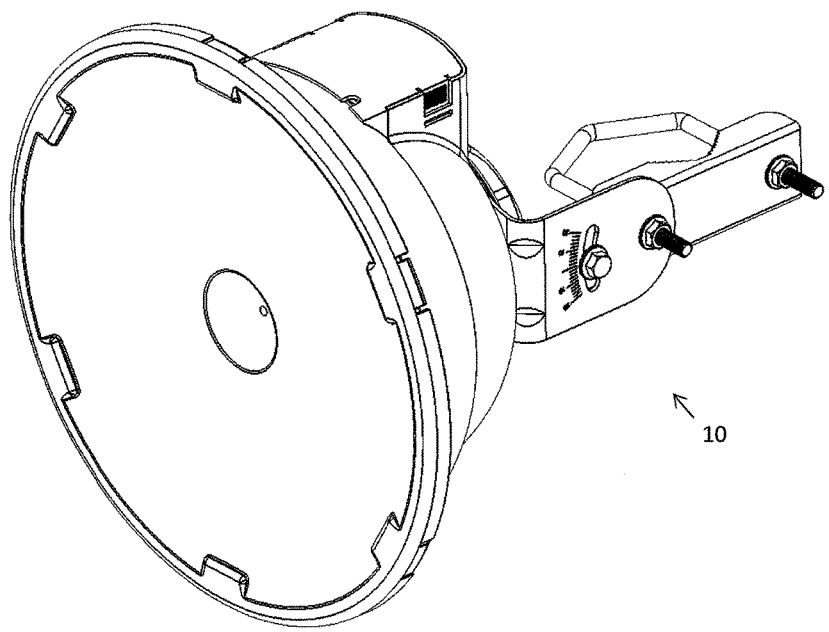
FIG. 8A shows one variation of an antenna assembly confirmed having a single emitter element (a patterned antenna radiating emitter) that is configured to direct multiple beams at different polarization, spectral signal and/or delays that are reflected by primary and secondary reflectors and directed out of the assembly in the same direction.
Figure 8B:
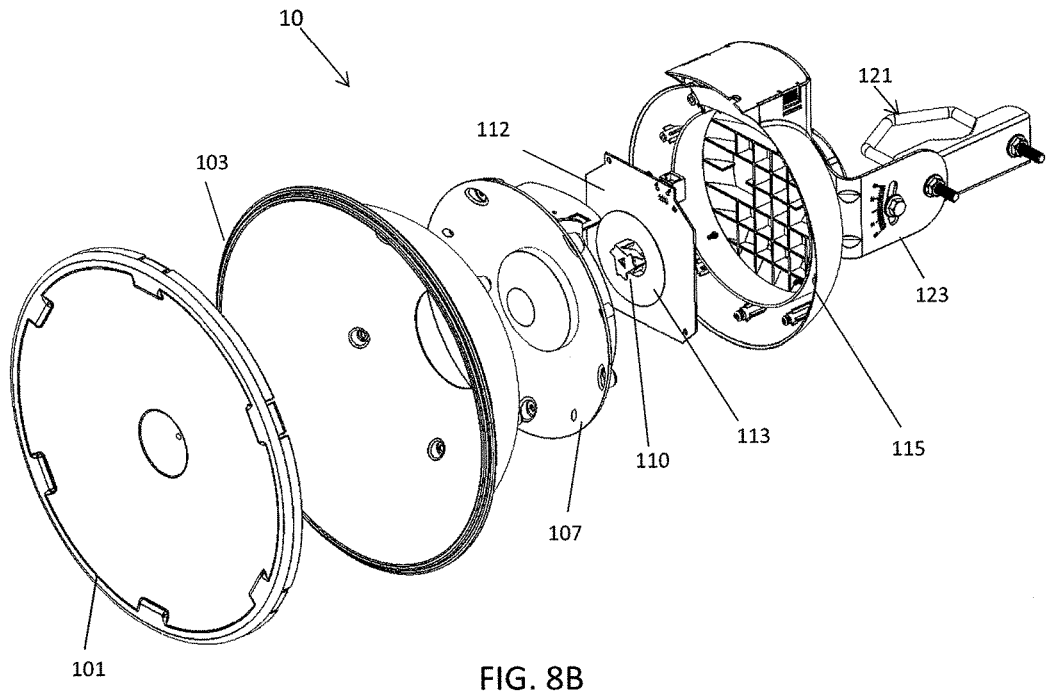
FIG. 8B is an exploded view of the apparatus of FIG. 8A.

For example, FIG. 8A illustrates one variation of an antenna assembly, and FIG. 8B shows an exploded view of this example. In this variation of a wireless transmission station, the device 10 includes a shaped radome 101 covering the outer opening of the primary reflector 103. In this example, the radome fits in the upper edge of a primary reflector 103. A secondary reflector (not visible in FIGS. 8A and 8B, but illustrated below in FIGS. 8C-1E) is supported by the back side of the radome and is centrally positioned.

Figure 8C:
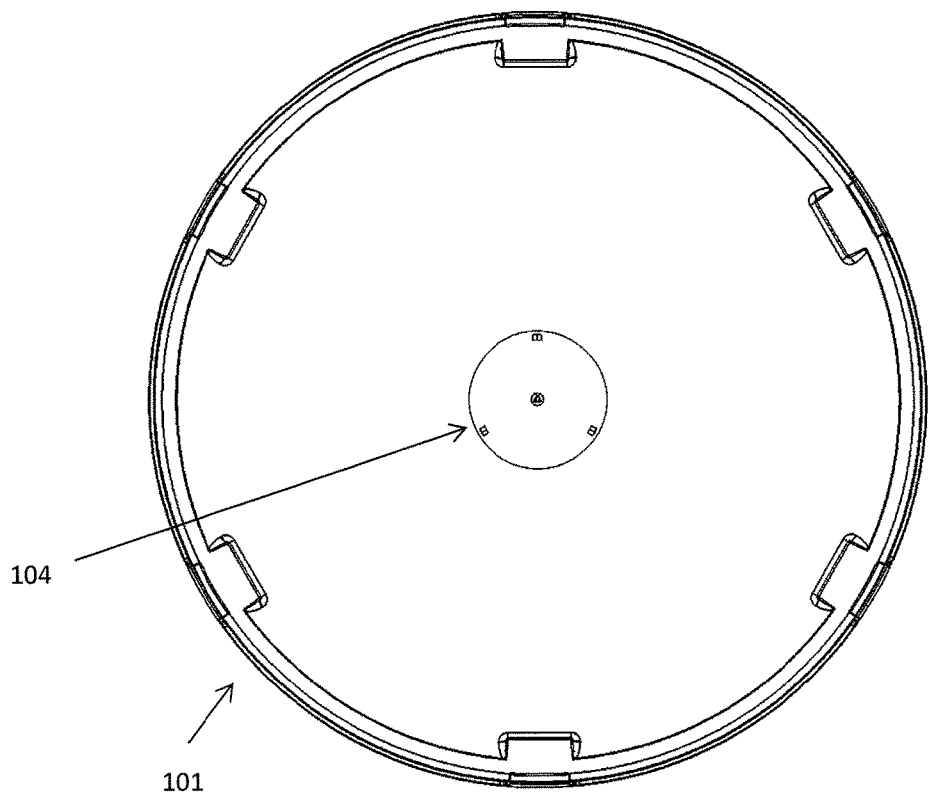
FIGS. 8C, 8D and 8E show a shaped radome including a secondary reflector, which may be included with some variations of an antenna assembly.
Figure 8D:
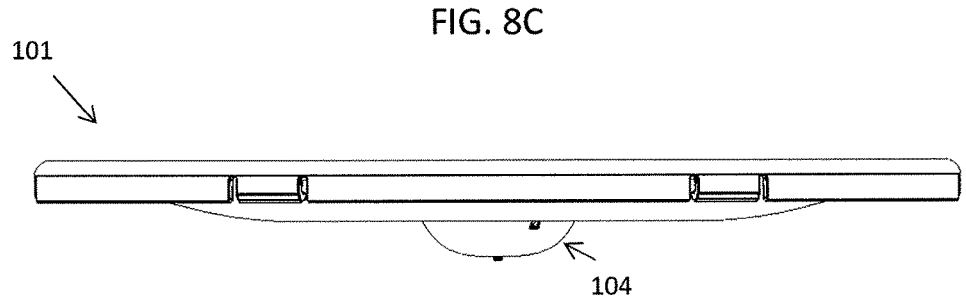
Figure 8E:
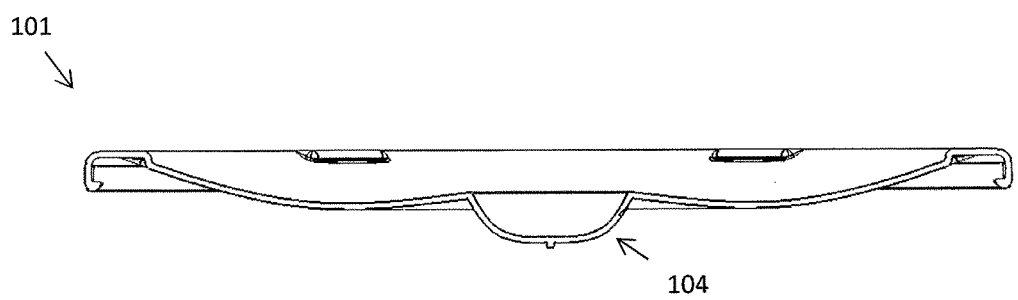

FIG. 8C is a back view of the radome of FIGS. 8A and 8B, showing the secondary reflector 104. FIG. 8D is a side view of the radome including the secondary reflector attached at the center of the radome on the inner side, and FIG. 8E is a sectional view through the radome. As will be discussed in greater detail below, the secondary reflector 104, which in this example is on the radome, may be positioned so that it reflects the different beams to the primary reflector and out of the antenna. The secondary reflector 104 has a curved, convex outer surface, so that the RF signals are reflected within the primary reflector so that the primary reflector reflects the RF signals out of the apparatus, though the shaped radome which may help make the phase front of the RF signals more uniform.

An antenna submount assembly 107 (also referred to as the housing front) attaches behind the secondary reflector at the base of the primary reflector 103. When receiving signals, the antenna may collect the signal from the secondary reflector and direct it to an orthomode transducer (OMT) probe, which is also referred to as the primary feed having the emitter (or in the apparatuses described herein, a patterned emitter) 110. The OMT probe absorbs the collected signal and conducts it to the connector (not shown). An OMT probe may also be referred to as a polarization multiplexer, and may be used to either combine or to separate orthogonally polarized microwave signal paths. OMT probes may be used with (or without) feed horn antennas to isolate orthogonal polarizations of a signal and to transceive signals to different ports. In FIGS. 8A and 8B, the primary feed (including the patterned emitter) is a planar element 110, which is described in greater detail below, and may allow multiple beams having different polarizations to be directed from the same emitter (and thus, the same antenna apparatus). The beams may be independent and isolated from each other. When emitted by the patterned emitter of the primary feed, the RF signals of different polarizations are fed into the primary feed by different, and independent, antenna feeds, and the resulting RF signal beam leaves the emitter surface in different locations for the different polarizations, thereby reflecting from different regions of the primary and secondary reflectors in this example.

In FIGS. 8A and 8B, rear housing 115 covers the antenna submount assembly (emitter 110, PCB 112, and plate/horn 113). Within the rear housing 115, a probe housing holds the primary feed. A bracket assembly for mounting to a pole 121 is attached to the back of the shroud and may include a locking/lockable adjustable elevation bracket 123.

Figure 9A:
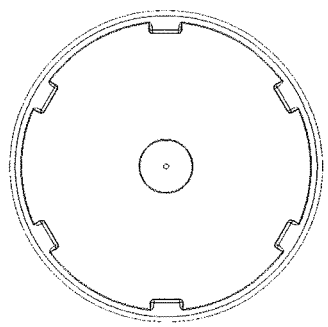
FIGS. 9A, 9B, 9C, 9D and 9E show front, top, bottom, left side and right side views, respectively, of the apparatus of FIGS. 8A and 8B.
Figure 9B:
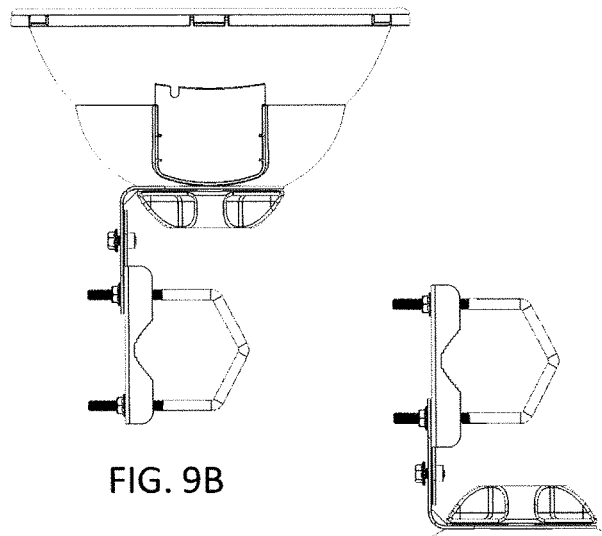
Figure 9C:
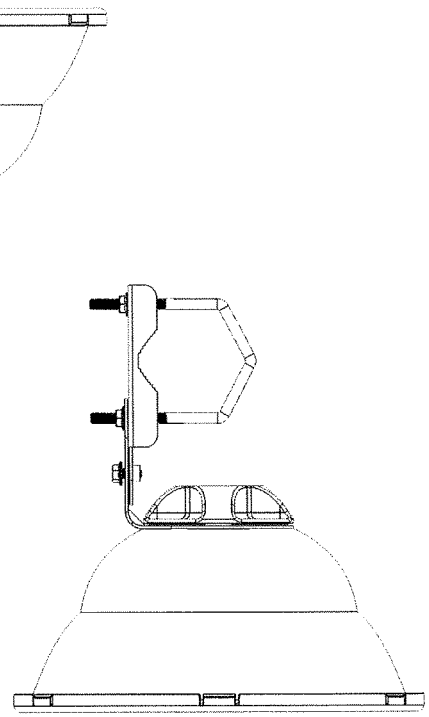
Figure 9D:
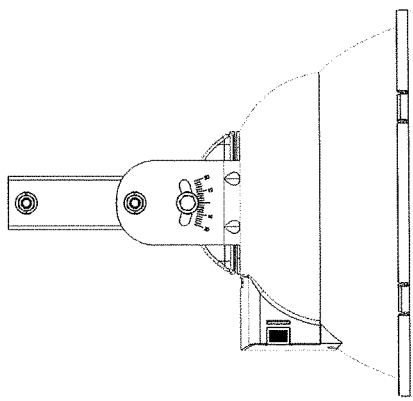
Figure 9E:
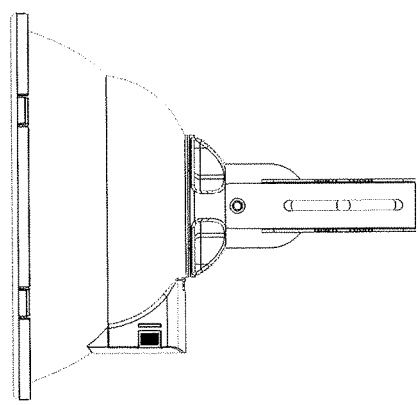

FIGS. 9A to 9E illustrate different views of the assembly of FIGS. 8A-1B, from front (FIG. 9A), top (FIG. 9B), bottom (FIG. 9C), left side (FIG. 9D), and right side (FIG. 9E).

Figure 10A:
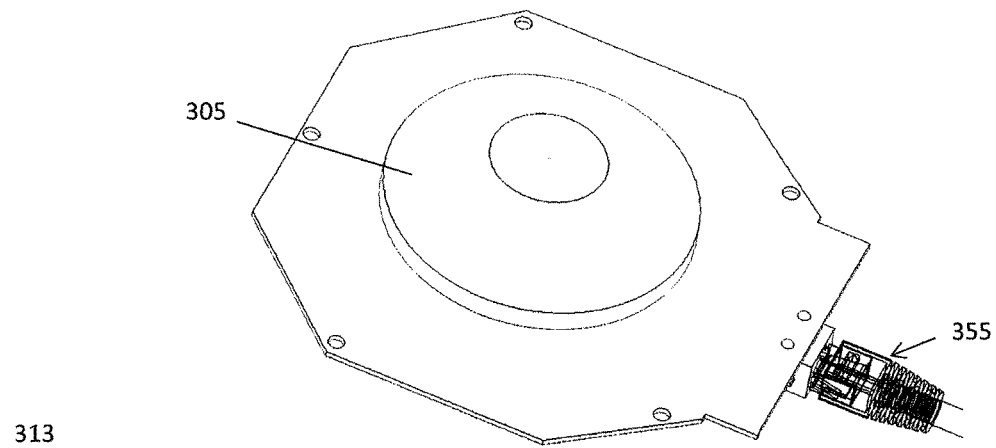
FIG. 10A illustrates one variation of a primary feed having a single emitter, and radio circuitry for an antenna assembly. In this example, the primary feed is covered by a cap (e.g., radome element).
Figure 10B:
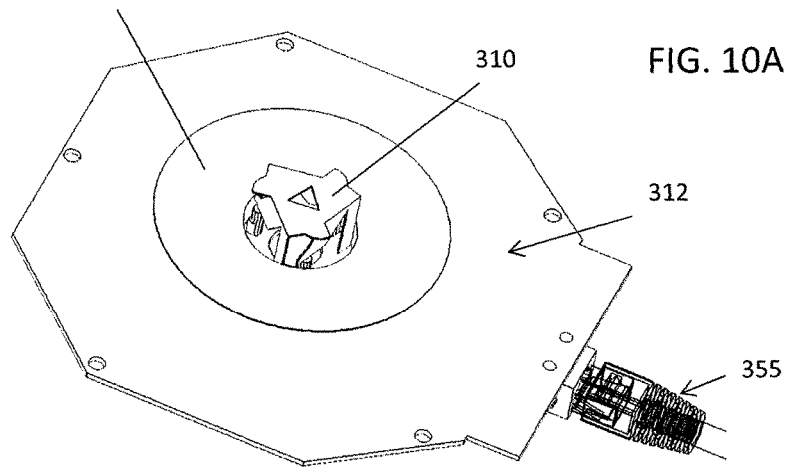
FIG. 10B shows the same components but with the radome cover removed, exposing the primary feed including the single patterned antenna radiating emitter and a horn region.
Figure 10C:
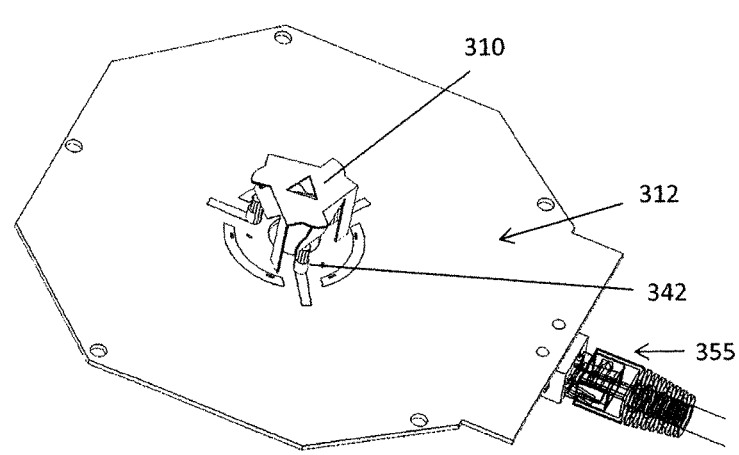
FIG. 10C shows the same components as in FIG. 10B, but with the horn removed, exposing the base (e.g., PCB) to which the primary feed is coupled.
Figure 10D:
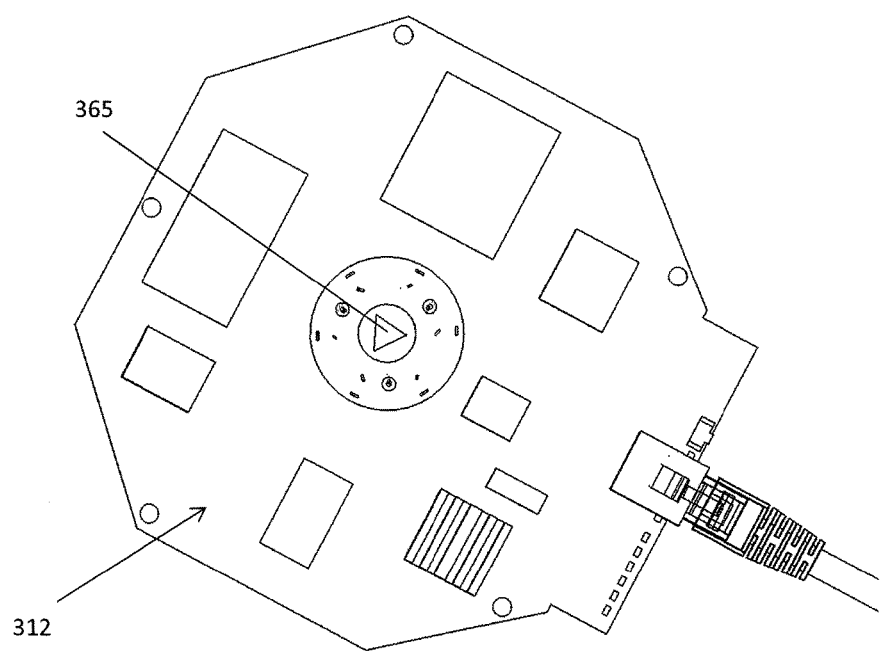
FIG. 10D shows a back view of the base to which the primary feed of FIG. 10C is coupled.

FIGS. 10A-10D illustrate the antenna submount assembly of the apparatus shown in FIGS. 8A-8E. For example, FIG. 10A illustrates the antenna submount assembly with a cover or cap 305. FIG. 10B illustrates the antenna submount assembly without the antenna cover, showing the emitter 310 and back plate 313. The back plate 113, 313 may be configured as (or may include) a horn (and in such variations may be referred to as a horn), as shown below in FIG. 12C. FIG. 10C is another view of the antenna submount assembly similar to that shown in FIG. 10B, but with the plate/horn portion removed, showing the emitter mounted to the supporting printed circuit board (PCB 312). In some variations the PCB may include the antenna circuitry, including radio circuitry and is shown connecting (via cable 355 connector) to one or more other devices, for processing the signals received and/or transmitted by the antenna apparatus. In some variations the circuitry is located on the back side of the support (PCB 312) and may include connections through the PCB to the isolated and independent feeds 342. For example, FIG. 10D shows a back view of the subassembly of FIG. 10C, illustrating the back of the PCB 312, including circuitry and the connection to the emitter. A central opening 365 through the emitter is visible in FIG. 10D, showing through which another element, such as a fiber optic or other lightpipe may be passed. In some variations, the back of the apparatus may include a plurality of connectors for connecting the antenna feeds to radio circuitry.

In this example, the PCB acts as a substrate holding the emitter and radio circuitry; in some variations a separate substrate (or additional substrate(s)) may be used, including a ground plate.

In the antenna subassembly shown in FIGS. 10A-10C, there are three antenna paths, as the emitter may operate with three separate and beams and is fed by three electrically isolated and independent antenna feeds. In the example multi-focal point antenna assembly shown in FIGS. 8A-8E, each antenna path (beam) has a corresponding sector for the primary and the secondary reflectors, and each sector may be optimized to improve the gain. These sectors (region s on the primary and secondary reflector) may be separate or overlapping.

The multi-focal point antenna assembly shown in FIGS. 8A-8E is a tripole antenna that may operate similar to a "planar inverted F type" antenna, in which the emitting surface includes both a shorting pin or shorting post on one side and a feed (feed point) along another side. However, in a traditional planar inverted F type antennas a single feed is connected to a patch emitting surface and the overall dimensions of the surface are typically rectangular (or square) having a path length that adds up to a fraction (e.g., a quarter or half) of the desired wavelength. Because the patch is shorted to ground at the end, the current at the end of the patch antenna is not forced to be zero (and may therefore have the same current-voltage distribution as a half-wave patch antenna). Unlike traditional planar inverted F type antennas, the emitters descried herein typically have 3 or more feed points (feeds) corresponding to the beams to be emitted, and have three or more shorting posts, pins or surfaces.

Figures 11A, 11B, 11C:
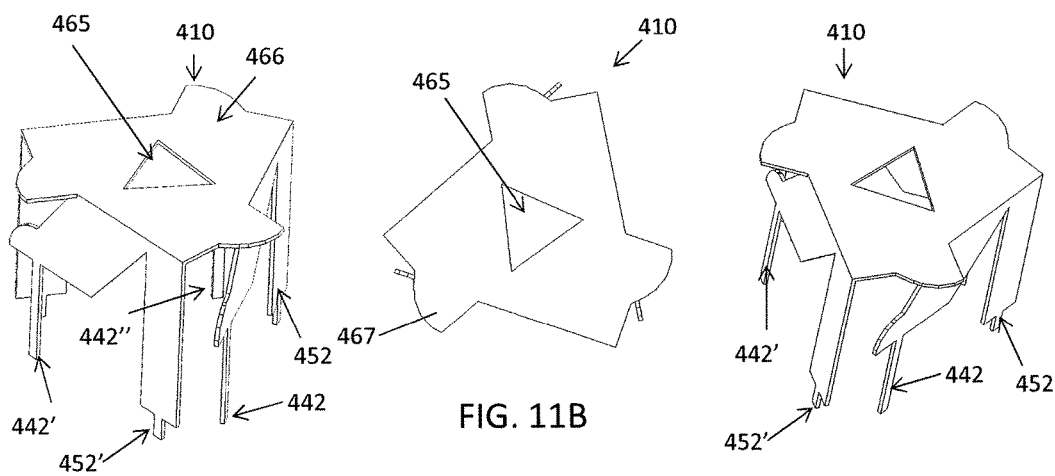
FIGS. 11A, 11B and 11C illustrate a first perspective, top and second perspective view, respectively, of one variation of a primary feed having a patterned antenna radiating emitter.

FIGS. 11A-11C illustrate an example of a primary feed having an emitter for a multi-focal point antenna, as described herein. The primary feed having a single (patterned) emitter shown in FIGS. 11A-11C is the same as the primary feed shown in the example of FIGS. 8A-8E. In this variation, the primary feed includes an upper flat surface 466 (radiating/emission surface). FIG. 11A shows a side perspective view of this primary feed. In this example, the emission (flat, upper) surface includes an opening 465 that may be used to pass another element (such as a lightpipe, e.g., fiber optic, etc.). The overall shape of the primary feed in FIGS. 11A-11C is roughly triangular, as is apparent in the top view shown in FIG. 11B, although only approximately triangular. In this example, the outer circumference includes folded-down regions and non-folded down regions (e.g., flaps 467) and/or cut-out regions (not shown in this example) which may slightly alter the overall triangular shape. The emitter shown in FIGS. 11A-11C is triangularly symmetric, so that each 120 degree radial slice of the device, taken from the top center of the emitter (as in FIG. 11B), is repeated.

In general, the multi-focal emitters (primary feeds) described herein for emitting n beams include n feeds. In FIGS. 11A-11C three antenna feeds (442, 442', 442") are shown, and the primary feed is configured to emit three beams, with each beam in a slightly different direction. In addition, three separate shorting (grounding) regions (pins, posts, etc.) 452, 452', 452" are shown. Each of the antenna feeds is typically isolated (electrically isolated) and independent of each other, and feeds onto the same plate/plane. In this example, the antenna feeds each connect to a folded-over flap region that is adjacent to the shorting element (pin or post). In practice, electrical energy fed by each antenna feed may result in emission of an RF signal having a slightly different average vector (e.g., beam angle/polarization). The beams may be, in some cases, orthogonal to each other.

Figures 12A, 12B:
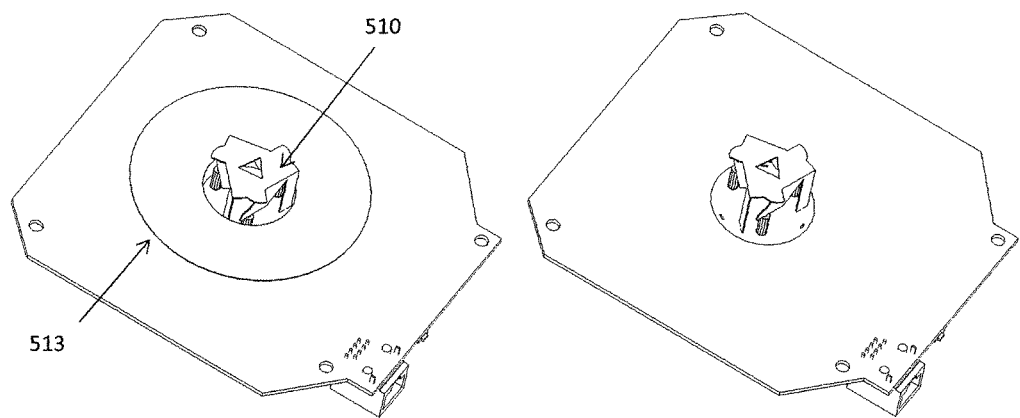
FIGS. 12A and 12B show an alternative view of a primary feed including an emitter, and radio circuitry for a multi-focal-point antenna.

FIGS. 12A and 12B illustrate an alternative variation of an antenna subassembly including a primary feed and an emitter and backing (PCB) also including radio circuitry for a multi-focal-point antenna. In this example, the sub-assembly shown in FIG. 12A includes a horn 513 around the emitter element 510. The subassembly may also include feed lines from the radio circuitry connected to and feeding the feeds attached to the resonating emitter plate, and a DC-shorting plate (e.g., a ground plane/plate) that is connecting the ground and the top plate through the aforementioned shorting pins/posts. FIG. 12B shows the subassembly of FIG. 12A with the horn removed.

The primary feed having an emitter shown in FIGS. 12A-12B has a slightly different geometry than the emitter of FIGS. 11A-11C. In general the primary feed element (with an emitter or emitter surface, also referred to as a radiator) is a made of a metal sheet having a central planar region, with one or more folded-down regions from which the feed and shorting posts/pins connect, as illustrated. This emitters described herein may be referred to as patterned antenna radiating emitter (or simply patterned emitters), because they may include repeated patterns of flaps (e.g., islands) and cut-out regions; these patterned regions may be radially repeated to form the overall pattern of the emitter. The cut-out regions may be notches in the edge of the emitting surface, or inside the periphery of the emitting surface. In some variations the cut-out regions are on the folded-over regions continuous with the flat upper surface. The patterned emitter of the primary feed may be mounted above a ground plane using dielectric spacers (not shown). In general, the patterned emitter may be formed from an electrically conductive material of the type conventionally found in antenna radiators, such as aluminum, copper and other malleable metals. The primary feed (including the emitter/radiator surface) may be stamped from a single piece of electrically conductive material.

Figure 12C:
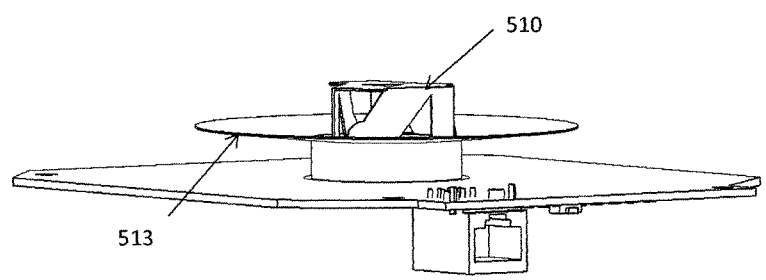
FIG. 12C is a side view of the components shown in FIG. 12A, including the horn.

FIG. 12C is a side perspective view of the antenna subassembly of FIGS. 12A and 12B, showing the primary feed with a patterned antenna radiating emitter 510 projecting slightly above the horn 513 from the base plate of the PCB.

Some, but not all, examples of the multi-beam primary feeds including patterned antenna radiating emitters may be generally shaped as an equilateral triangle (e.g., having a "trianguloid" shape). In some variations an apex of each triangle is grounded and there are three antenna feed points (antenna input feed points), each proximate to one of the apices. One or more opening, hole, slot, etc. (e.g., in FIGS. 11A-11C the opening is triangularly shaped) may be positioned within the primary feed (e.g., emitter surface). The opening(s) may be centered on the upper plane of the emitter surface or it may be offset. The primary feed may be shaped such that energy entering from each antenna input feed does not interfere with energy from other antenna input feeds. The topology of the antenna as well as slot shape and position may be chosen according to the desired performance characteristics.

Figure 13A:
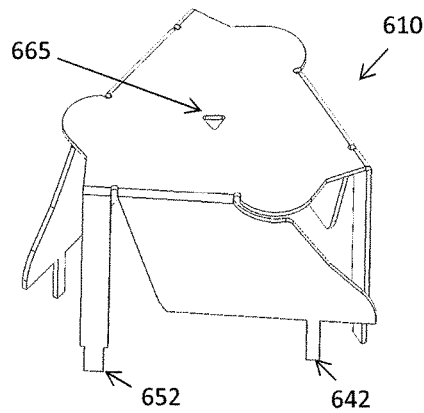
FIGS. 13A, 13B and 13C are top perspective, side perspective and top views, respectively, of another variation of a primary feed including a single (unitary) patterned antenna radiating emitter.
Figure 13B:
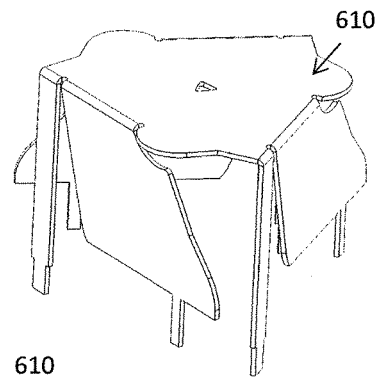
Figure 13C:
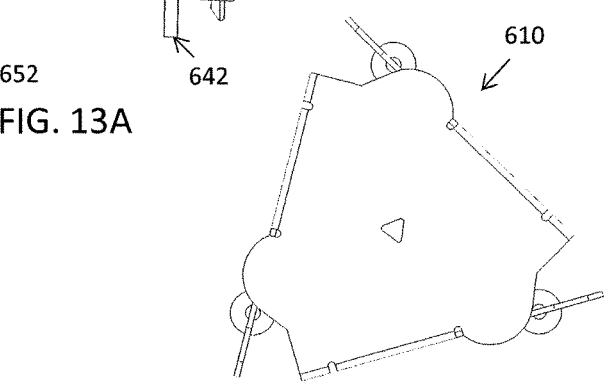

FIGS. 13A-13C and 14A-14C illustrate alternative variations of multi-beam primary feeds having patterned antenna radiating emitters that may be used; each of these examples, like the variation shown in FIGS. 11A-11C, is configured to emit three beams (e.g., n=3). In FIGS. 13A-13C, the primary feed 610 includes a flat planar emitting surface, and three antenna input feeds 642, each connected to flap bent down from the upper emitting surface, and three shorting (ground) pins/posts 652. The primary feed also includes a small opening/slot 665 in the center of the upper emitting surface. FIGS. 13B and 13C show another side perspective view and a top view, respectively, of the same primary feed with an antenna radiating element. As shown in FIG. 13C, the antenna input feeds may be insulated or covered along at least part of their length by a surrounding sheath.

Figure 14A:
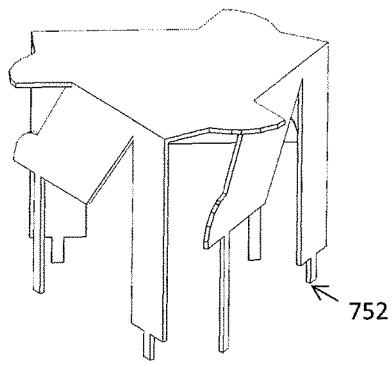
FIGS. 14A, 14B and 14C are top perspective, side perspective, and top views, respectively of another variation of a primary feed including a single patterned antenna radiating emitter.
Figure 14B:
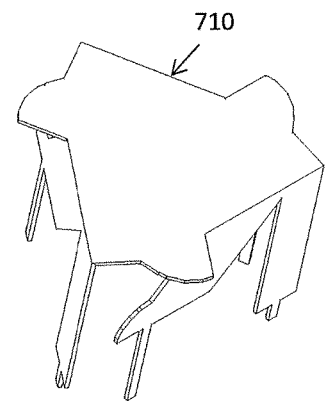
Figure 14C:
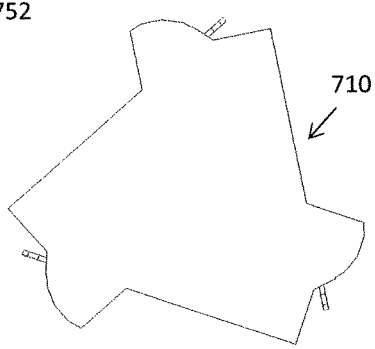

The exemplary primary feed having an antenna radiating element 710 in FIGS. 14A-14C, like FIGS. 13A-13C, is generally triangular in shape (trainguloid), but does not include a central opening/slot. The planar emitting surface is fed by three antenna input feeds 742 connected to a bent-over flap region that is positioned adjacent to a shorting pin/post 752 which connects to the upper planar emitting surface by a separate flap region.

The antenna primary feeds described herein may be used with one (or preferably more) antenna reflectors to further guide the emission of the beams a particular direction, as discussed above. For example, returning to FIGS. 8A and 8B, a multi-beam antenna system having a single primary feed with a single emitter may be configured so that it includes a primary reflector 103 and a secondary reflector, as discussed above. The primary reflector and secondary reflectors may have different regions that are targeted by each of the different beams to/from the patterned antenna radiating emitter surface. For example, for each radiating element, there may be a corresponding "wedge" (e.g., radial region) of the primary reflector and a corresponding wedge (e.g., region) of the secondary reflector that direct energy from each beam. In the example of FIGS. 8A-8E, each wedge spans 120 approximately degrees. In embodiment in which the different beams may result in unequal wedge sizes (e.g., when the wedge may have unequal arcs), alignment markings may be included on the reflectors to ensure that each antenna path is centrally positioned within the respective wedge. This configuration may effectively allow multiple "beams" (as from multiple, offset antennas) to be handled by a single antenna. A primary feed with an emitter (such as the ones shown in FIG. 11A, 13A or 14A) having multiple antenna input feed points, e.g. 3, may be positioned within a feed horn, as shown. The emitter of the primary feed in these examples is a triangular-shaped shorted emitter with three antenna paths, however other variations may include more than three independent antenna input feeds and corresponding paths (e.g., four, five, six, seven, eight, or more feeds and a corresponding number of paths/beams).

When a driving frequency is applied to the primary feed's emitter surface, the emitter typically radiates electromagnetic waves. The shape and size of the primary feed, as well as the driving frequency, typically determine the radiation distribution pattern. In the examples shown, the horn (when present) is on-axis with the origins of the primary and the secondary reflectors. The horn may have a slightly larger diameter than that of the secondary reflector. The horn may have a subtended angle such that for each sector (corresponding to each of the beams), the antenna signal may be received and directed from the secondary reflector to the primary reflector. The flare of the horn may be optimized for each sector.

As mentioned above, this apparatus is not limited to tripole sector antennas, but may include antenna assemblies that have a primary feed fed by more than three antenna input feeds (e.g. n feeds) capable of detecting/emitting n signals paths, where $n \geq 2$ (and particularly $n \geq 3$). In some variations the apparatus may also include a primary reflector, a secondary reflector, and a collector (including a primary feed). In some variations, the antenna may be referred to as a feed horn antenna. The antenna may have a waveguide that interposes a horn and a radiator configured to emit n independent beams in different (average) directions, each transmitting a signal. Although the electromagnetic profile on the primary feed with an emitting element may be complex, it may be simplistically thought of as having n different emitting "regions" on the emitting surface that each emits a beam. Similarly, a primary reflector (when used) may have n regions, each region directing electric energy waves corresponding uniquely to one of the n signals, each region a portion of a parabolic surface. A secondary reflector may have n regions, each region directing electric energy waves corresponding uniquely to one of the n signals toward its corresponding region of the primary reflector, and each region may have a hyperbolic (e.g., convex) surface. The collector (primary feed) may absorb only a portion of the electric energy waves directed toward the secondary reflector, the portion of the waves consists of only those waves which may otherwise reflect back to the feed horn antenna.

Any of the antenna systems described herein may also be configured to have a single reflector. For example, in some variations a secondary reflector is not included, but the primary feed of the antenna is suspended above the base of a primary reflector. For each antenna path, the energy may exit the antenna and reflects off the primary reflector portion in a corresponding sector. In this variation, the feed horn antenna (including the primary feed) can also emit n signals, where $n \geq 2$.

The variations shown are not drawn to scale. In each variation, when referencing the origin of the polar coordinate system, the (average or net) output of each antenna signal may be positioned along a unique ray. In some variations the rays are equally distributed and the corresponding radii are the same length. In some variations, the rays are symmetric along the 0 and 180 rays or along the 90 and 270 degree rays. In some variations, the rays are not evenly distributed and the corresponding radii have dissimilar lengths In the systems shown in FIGS. 8A-8E above, an adjustable bracket is included. For example, an L-shaped bracket is shown in FIGS. 8A and 8B, and is positioned adjacent the rear housing. One end of the L-shaped bracket includes a housing hole that receives the threaded portion of the rear housing. In this variation, there are two diametrically opposed curved slots proximate the housing hole, each receiving one of the radially positioned alignment posts. On opposing edges of the housing hole, there are two extended lips. The lips, when a quarter turn twist is applied, secure the bracket to the base of the partially threaded support. The opposite end of the bracket has an alignment slot and an anchor hole. There are alignment markings positioned near the alignment slot indicating angles. In one variation, the detents and the radially positioned posts orient and secure the bracket with respect to the rear housing. This example also includes a pole bracket having two holes that are separated by a distance of at least the diameter of a pole. The pole bracket further includes an alignment post. A U-bolt having two threaded ends is shown positioned to fit into the holes of the bracket.

In operation, first, the L-shaped bracket may be attached to a pole (not shown) when the U-bolt is positioned through the pole bracket and then the bracket. The alignment post of the pole bracket moves within the alignment slot of the L-shaped bracket. The combination of the U-bolt and the pole bracket is used to adjust the tension. After it is secure, the antenna assembly is attached when the rear housing is positioned into the housing hole and a quarter turn is applied. The operator can pivot the antenna assembly about the thread closest to the alignment slot.

A method of operating the antenna assembly may generally include transmitting at least n directional antenna signals, where $n \geq 2$, from a single emitting element of the antenna; the method may include transmitting each of the n beams towards a reflector that has a unique corresponding region for each antenna signal. The reflector may receive reflected electric energy waves by the reflector. A collector may absorb only a portion of the reflected electric energy waves, the portion of the waves consists of only those waves which may otherwise reflect back to the single substrate antenna array.

A method of operating the antenna assembly may also or alternatively include transmitting at least n directional antenna signals, where n≥2, from a single emitter towards a secondary reflector that has a unique corresponding region for each antenna signal (beam). The n directional antenna signals may be directed by a feed horn. The electric energy waves may from a secondary reflector that is directed towards primary reflector that has a unique corresponding region for each antenna signal (beam). The primary reflector may receive reflected electric energy waves. The secondary reflector may receive reflected electric energy waves by the primary reflector and direct it to a collector. A collector may absorb only a portion of the reflected electric energy waves, e.g., the portion of the waves consisting of only those waves which may otherwise reflect back to the single substrate antenna array. In any of these examples, the n directional antenna signals may be aligned with the corresponding regions on the reflectors.

Figure 15A:
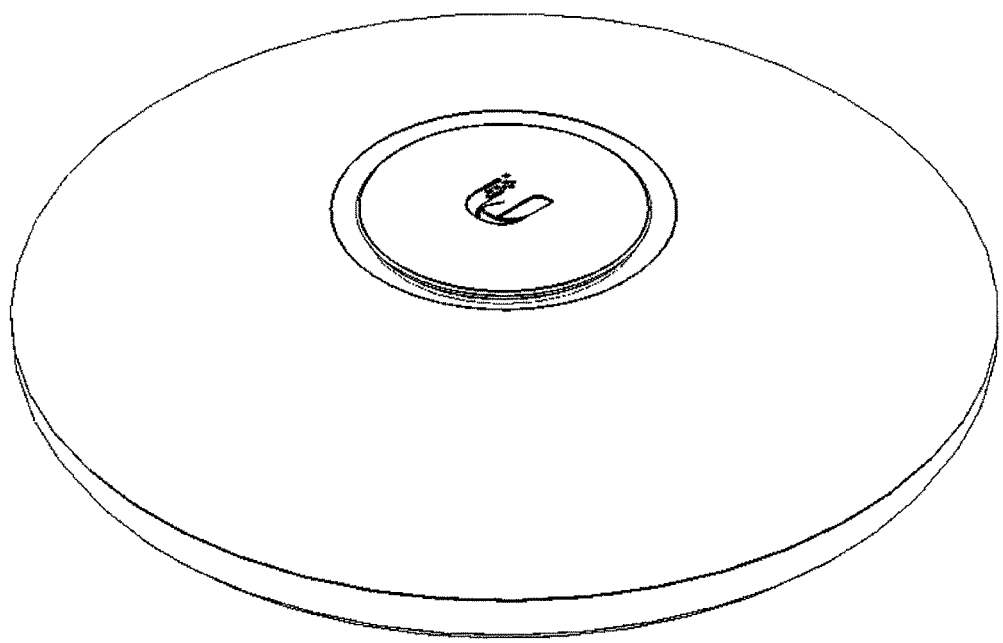
FIG. 15A is a perspective view of one variation of a wireless access point configured as a multi-focal-point antenna having a single primary feed with a single emitter that directs multiple beams at different polarization, spectral signal and/or delays. This variation is omnidirectional (or semi-omnidirectional) compared to similar devices shown in FIGS. 1A-1F, 9A-9F and 23A-23F.
Figure 15B:
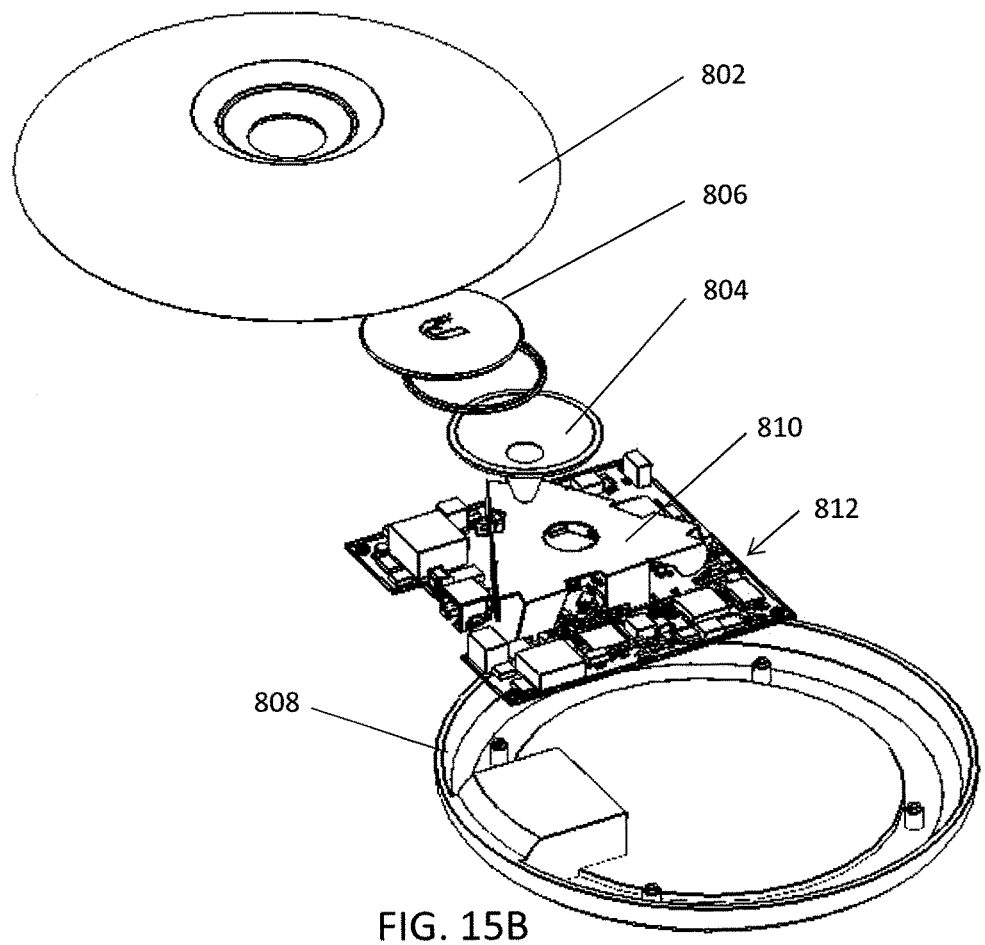
FIG. 15B is an exploded view of the apparatus of FIG. 15A, illustrating the single patterned antenna radiating emitter configured to emit three beams and control (radio) circuitry.

FIGS. 15A and 15B illustrate another variation of a wireless transmission stations having a multi-focal point antenna with a single emitter adapted to emit three or more independent beams. In this example, the apparatus is configured as an access point from which multiple beams may be transmitted/received, allowing for a single antenna that can operate as a MIMO device. The entire device may has a relatively small footprint (as shown in FIG. 15A), with an outer dome-like cover and a central region that may light up to indicate the status of the device (e.g., on/off, transmitting/receiving, error, etc.). The device may be mounted on an interior or exterior surface (e.g., ceiling, wall, etc.). An exploded view of this apparatus is shown in FIG. 15B.

In FIG. 15B, the outer cover (top cover) 802 is removed and the component parts (or assemblies of parts) are shown in a partially exploded view. In this example, the indicator light (e.g., LED) includes a lightpipe 804 having a cover (LED cover 806). A washer or illumination ring may also be included. The lightpipe will be described in more detail below. A bottom cover 808 may also be included, and may enclose the emitter 810 and radio circuitry 812. In the variation shown in FIGS. 15A-15B, which is configured as an access point, the antenna does not include a reflector. Instead, the emitter directly received and/or transmits.

FIG. 16 is a top view of the interior of the wireless access point of FIG. 15A with the enclosure and lightpipe cover removed, showing a top view of the interior of the device, looking down on the lightpipe which is on top of the emitter. The emitter in this example also includes a hole through which the lightpipe passes. The circuitry is schematically illustrated in this example. The emitter is connected above the PCB including the circuitry. FIGS. 17A and 17B are cross-sectional views through the xz and xy axes, respectively, showing the relationship between the emitter, lightpipe and radio circuitry. The emitter is connected via three feeds (though, as discussed above, more than three feeds may be used in some variation having an emitter configured to emit more than three beams) connected to an overhanging region of the planar emitting surface. In these figures three ground (shorting) connections are also made to the planar surface of the emitter.

Figure 21A:
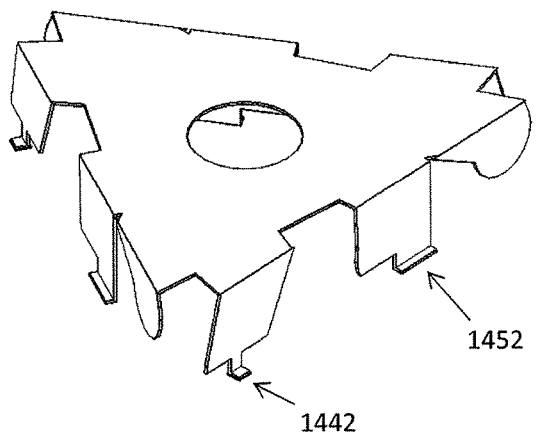
FIGS. 21A and 21B show perspective and top views, respectively of a generally triangular antenna radiating emitter of a primary feed.
Figure 21B:
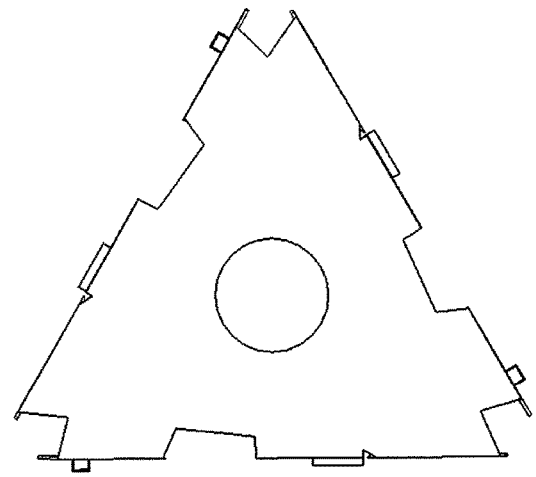

FIG. 18 is another top view of the interior of the wireless access point similar to that shown in FIG. 16, but with the lightpipe removed, showing the planar emitting (top) surface of the emitter. A more detailed view of the primary feed having a single emitter is shown in FIGS. 21A-21B. FIG. 21A is a front perspective view of a primary feed having an emitter (with another variation of a patterned antenna radiating emitter). In this example, the overall shape of the emitter is also approximately triangular (trianguloid), with notched/cut-out region along the edges of the planar top emitting surface; in addition one or more flaps or islands are folded down away from (and perpendicular to) the flat emitting top surface. The three antenna input feeds 1442 and shorting posts/pins 1452 are each connected to a folded-over flap region; the feeds may be insulated. The antenna input feeds are typically connect to a feed line and thus to the radio circuitry; the shorting posts/pins may be connected to a ground. The antenna input feed may connect to a connector (e.g., RF signal input connector) to connect to a radio circuitry (e.g., a radio device). Each connector may correspond to one of the antenna input feeds. As discussed above, the antenna input feed lines may be isolated from each other and independent of each other, and arranged along with the shorting pins/posts so that three (in this example) independent beams are emitted in three distinct directions.

Figure 22A:
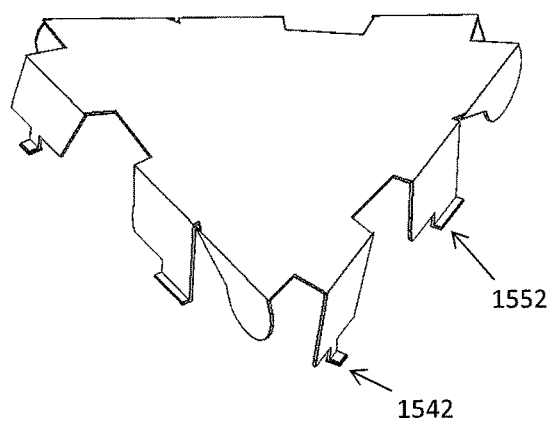
FIGS. 22A and 22B show an alternatively variation of a generally triangular antenna radiating emitter (which does not include a central aperture for a lightpipe).
Figure 22B:
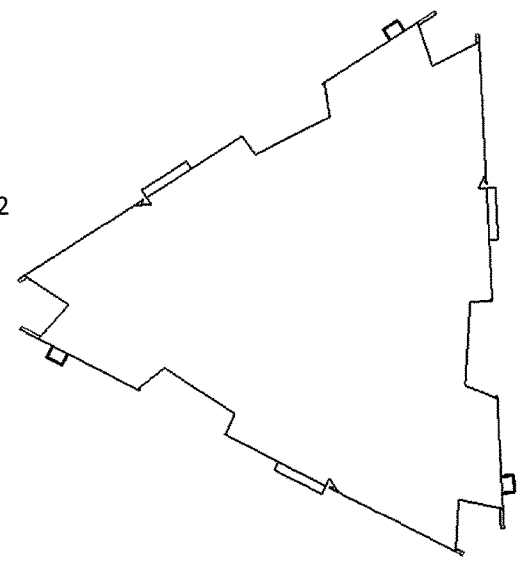

Another variation of an emitter is shown in FIGS. 22A and 22B; the primary feed with a single emitter in this example does not include an opening (slot) through the planar emitting surface as in the variation shown in FIGS. 21A-21B and 15A-15B. Instead, the planar emitting surface extends completely across the surface. Both feeds 1542 and shorting posts/pins 1552 are also included and arranged similarly to the arrangement shown in FIGS. 21A-21B.

Returning now to FIGS. 19A and 19B, these figures show sectional and top perspective views, respectively, of the inner assembly (lightpipe, radio circuitry and primary feed) of an access point such as the one shown in FIGS. 15A-15B. In this example, the wireless access point system consists of a bottom enclosure, e.g. shallow dish shaped housing, having a printed circuit board (PCB) contained within. The PCB contains radio circuitry to provide wireless access functionality A primary feed with a radiator element having an opening (slot, aperture, etc.) may be directly connected to the PCB by grounding (shorting) pins or legs and at least one feed point, such that the element is suspended above the printed circuit board (PCB). Within a portion of the opening, a light emitting diode is electrically connected to the PCB, as shown in FIGS. 17A and 17B. A cover mates to the top enclosure. In this example, a stem portion of a lightpipe 1216 encompasses the emission portion of an LED and extends through the aperture and the hole of the cover. An O-ring interposes the bottom rim of the lightpipe and the top enclosure. The cover is comparable in size to the cross-sectional area of the lightpipe and covers the lightpipe. A cable for Ethernet access, electrically connected to the circuitry, may extend through the mated enclosures.

In some variations, a lightpipe is funnel-shaped, having a conical mouth and a stem. The mouth has a larger perimeter than the stem. The stem encompasses the LED. The rim of the mouth extends beyond the cover of the access point. The mouth may be shaped as a cone. In general, the lightpipe redirects the LED light output to the desired location with minimal loss of intensity. In some variations the lightpipe is made of a polycarbonate material. The example shown in FIGS. 15A-19B is a vertical lightpipe, however, angled or planar lightpipes may also be used, or other light guides (including fiber optics) may be used.

Figure 19A:
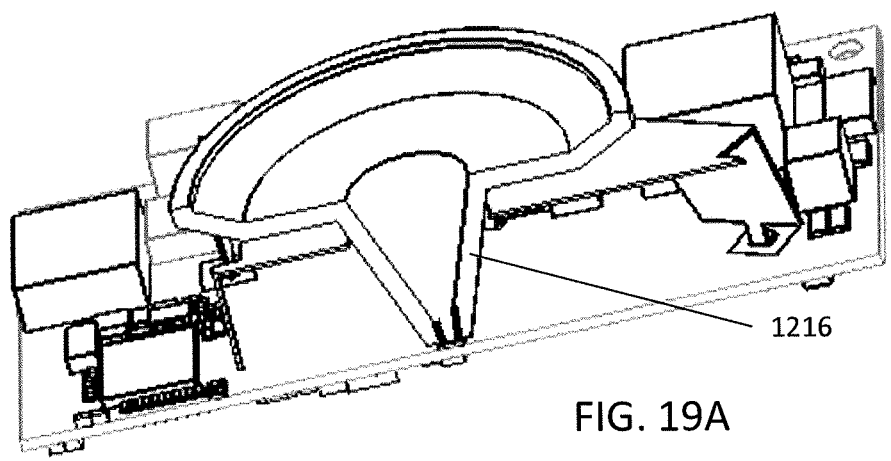
FIGS. 19A and 19B are sections through emitter, radio circuitry and lightpipe of the apparatus shown in FIGS. 9A-11), in which the lightpipe has a circular mouth.
Figure 19B:
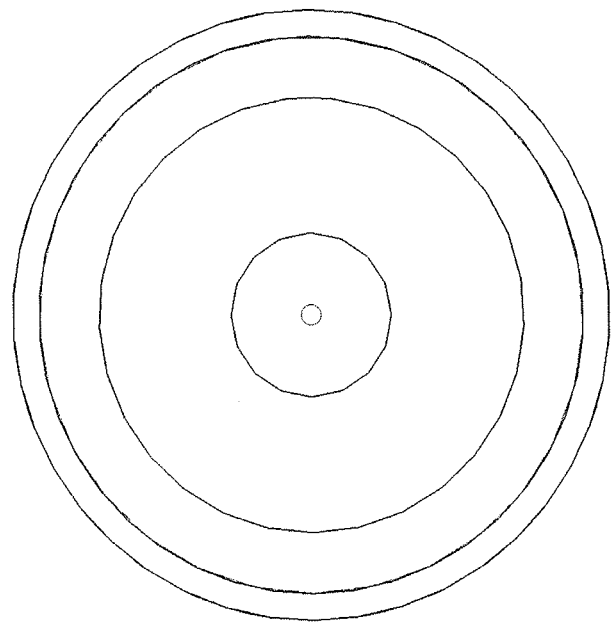
Figure 20A:
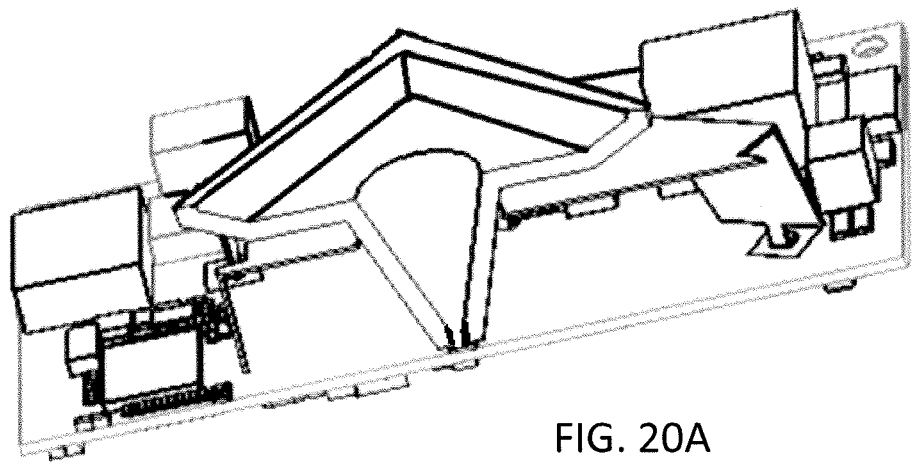
FIGS. 20A and 20B illustrate a variation similar to that shown in FIGS. 19A and 19B, in which the lightpipe has a square mouth.
Figure 20B:
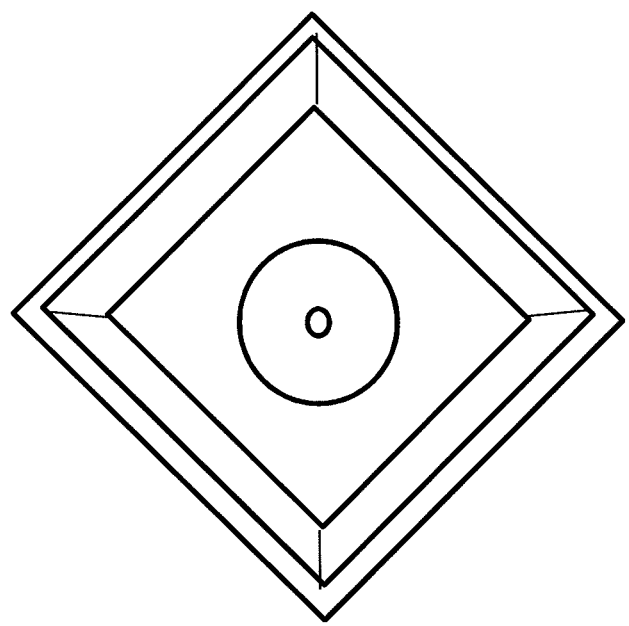

The lightpipe shown in FIGS. 19A and 19B has a circular mouth. FIG. 19A is a cross-sectional perspective view and FIG. 19B is a top view of the lightpipe. The mouth has a shallow profile and is dome shaped. Another variation is shown in FIGS. 20A and 20B. In FIGS. 20A and 20B the lightpipe has a square mouth. FIG. 20A is a cross-sectional perspective view. FIG. 20B is a top view of the lightpipe. The mouth has a shallow profile and is shaped as a truncated square pyramid. In general, the aperture of the radiator element may be a polygon, e.g. a triangle, rectangle, pentagon, etc., and the aperture through the emitter may be an opening having a portion large enough to accept the stem of the lightpipe. The shape, diameter, or depth of the mouth, length of diameter of the stem may all vary, and the surface of the conical mouth of the lightpipe may be textured, etc. to effect light extraction from the LED. Further the top of the enclosure may be textured to effect light extraction.

Figure 23A:
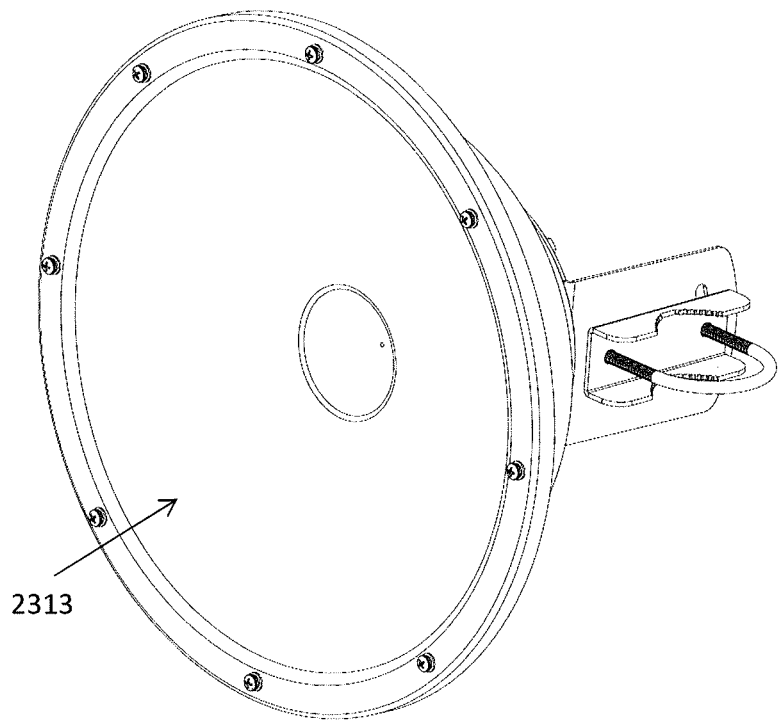
FIGS. 23A, 23B, 23C, 23D, 23E, and 23F illustrate another variation of an antenna apparatus including a single primary feed with a single emitter (patterned antenna radiating emitter).
Figure 23B:
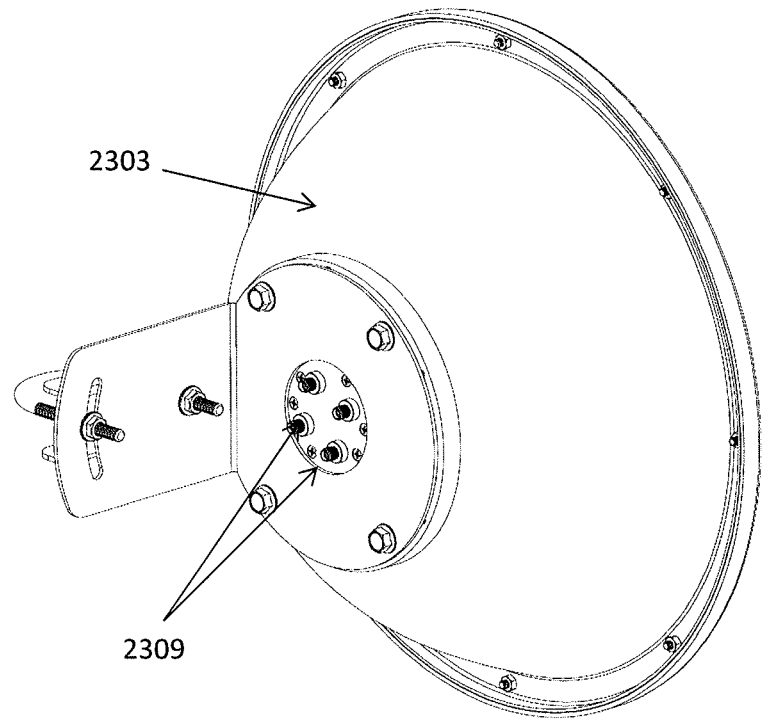
Figure 23C:
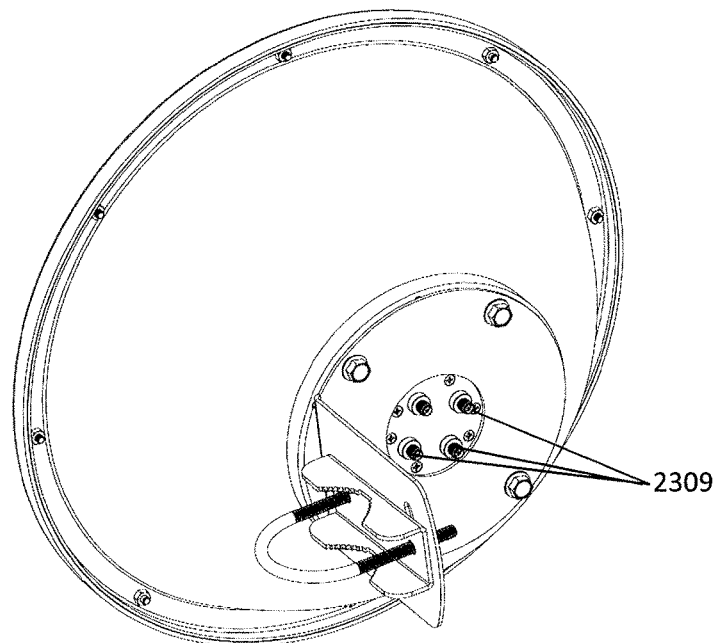

FIGS. 23A-23F illustrate another variation of an antenna assembly including a single primary feed that is fed by n=4 antenna input feeds and capable of handling (transmitting, receiving) four radio frequency (RF) beams from the same primary feed. In the example shown, e.g., in FIG. 23A, the front of the antenna assembly is shown. In this example, the front of the antenna assembly includes a primary radome 2313 coving the opening into the primary reflector 2303 which includes a parabolic inner surface (not visible in FIG. 23A or 23B). In FIG. 23B, the apparatus includes four connectors 2309 (antenna input connectors) that are coupled to the four antenna input feeds connecting to the primary feed, as will be described below in reference to FIGS. 23E-G. These antenna input feeds may be connected to a radio device having two or more antenna output lines. For example a radio device having a vertical and horizontal polarization outputs/inputs may be connected to the antenna device so that each of the four antenna inputs 2309 (antenna polarization RF signal inputs) is connected to either the vertical polarization, a shifted (e.g., inverted, phase shifted, etc.) version of the vertical polarization output/input. In some variations pair of outputs may be the same, but may be inverted (e.g., +vertical polarization/−vertical polarization, etc.).

Figure 23D:
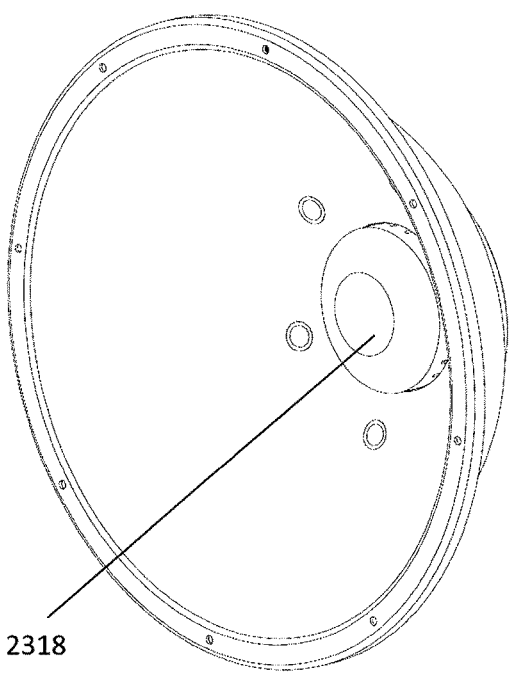
Figure 23E:
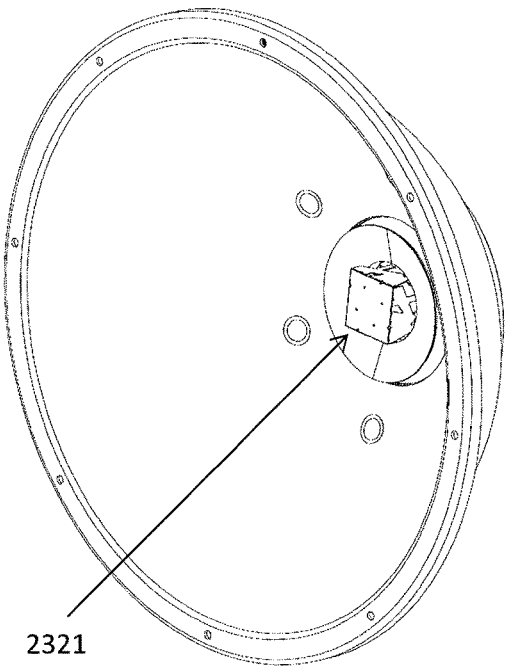

FIGS. 23D and 23E illustrate the inside of the opening formed within the primary reflector having a parabolic inner surface, after removing the outer (primary) radome covering the opening and an inner (secondary) radome that is shaped. In FIG. 23D, the sub-assembly including the primary feed 2321 (in FIG. 23E) is covered by a cap or sub-radome 2318; in FIG. 23E this protective cap/sub-radome 2318 has been removed, showing the upper (radiator) surface of the primary feed 2321.

Figure 24A:
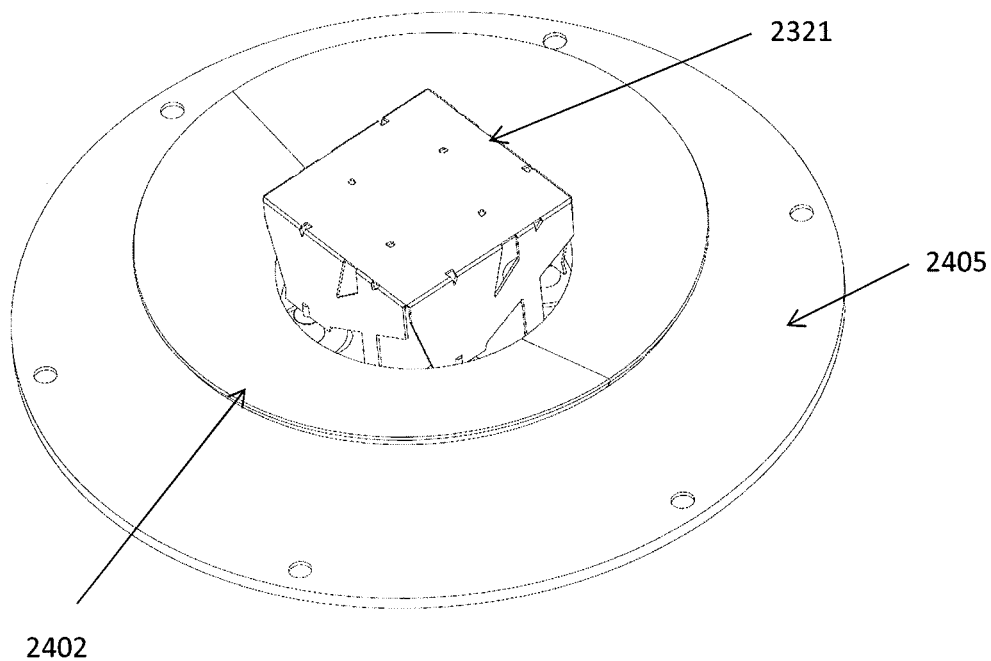
FIGS. 24A and 24B show alternative views of the primary feed having a patterned antenna radiating emitter with multiple antenna input feeds connecting at different locations to the same patterned antenna radiating emitter.
Figure 24B:
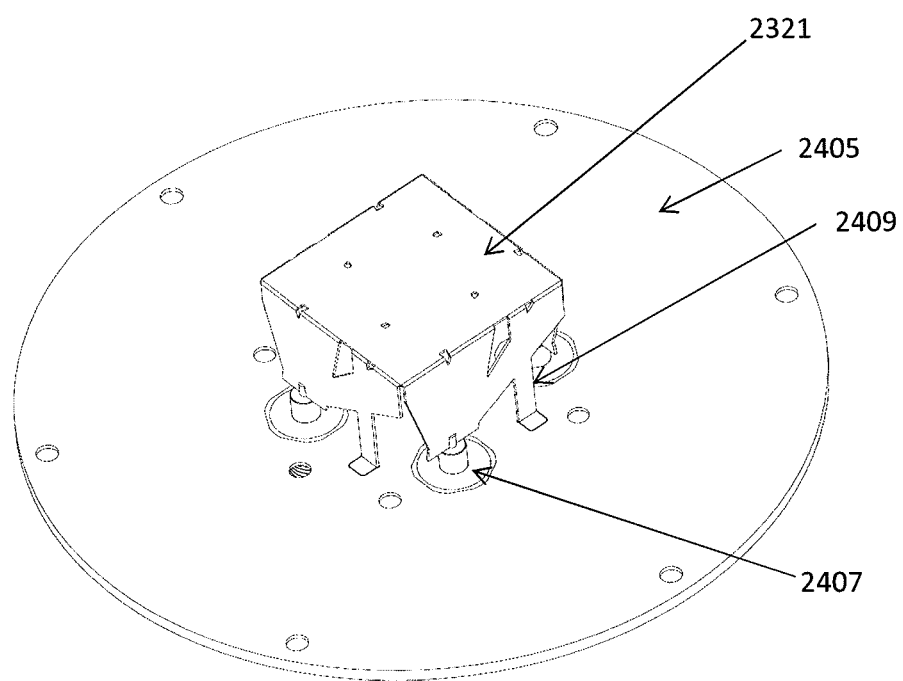

FIGS. 24A and 24B illustrate the antenna sub-assembly including the primary feed 2321. In FIG. 24A, the sub-assembly includes the ground plate 2405 and a horn portion 2402 around the primary feed 2321. In FIG. 24B the sub-assembly is shown without the horn, showing that the primary feed is connected via multiple projections 2409 to the ground, and there are four (in FIG. 24B, only two are visible) antenna input feeds 2407 that feed onto the emitter surface of the primary feed. The primary feed in this example is approximately square, having a plurality of cut-out regions that may help form the four separate beams corresponding to the separate antenna input feeds (and therefore separate polarized RF signals).

Returning now to FIG. 23F, a cross-section through the antenna assembly of FIG. 23A is shown. In this example, the arrangement of the primary reflector 2303, secondary reflector 2304 and primary feed 2321 is shown. A primary radome 2313 covers the opening into the primary reflector 2303, and within the primary reflector is a secondary radome 2314 that is shaped to lens RF signals transmitted through the secondary radome so the phase front of the transmitted RF signals is uniform (or approximately uniform). FIG. 23G is an exploded view of the apparatus of FIG. 23A (without the optional separate primary radome) RF signals (e.g., having different polarizations) applied to each of the antenna input feeds 2407 may be transmitted as separate beams from the primary feed (e.g., the patterned antenna emitting surface), to be reflected off of the secondary reflector that is arranged immediately opposite from the patterned antenna emitting surface of the primary feed, and then reflected off of the primary reflector for transmission out of the apparatus. This is illustrated in FIG. 25.

Figure 23F:
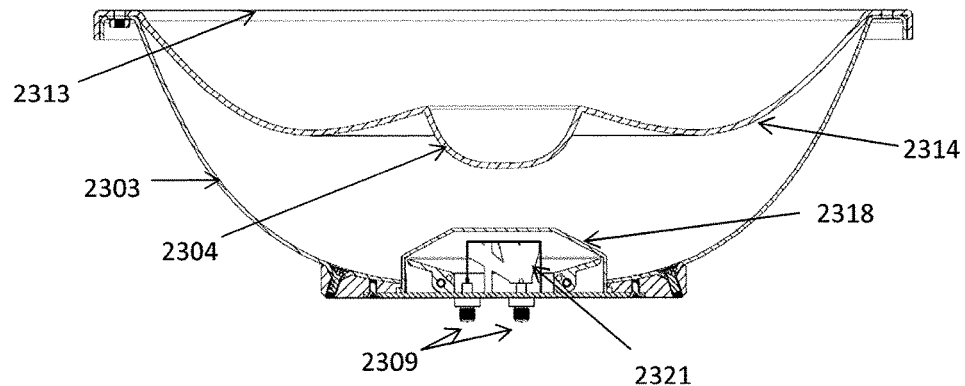
Figure 23G:
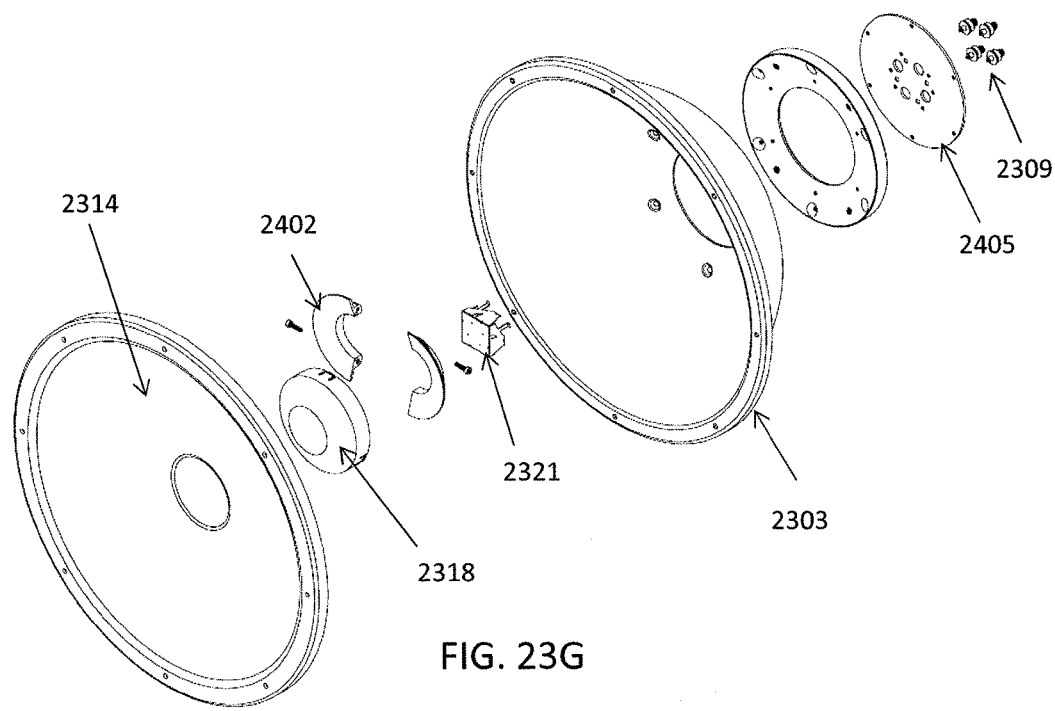
FIG. 23G is an exploded view of the apparatus of FIG. 23A.
Figure 25:
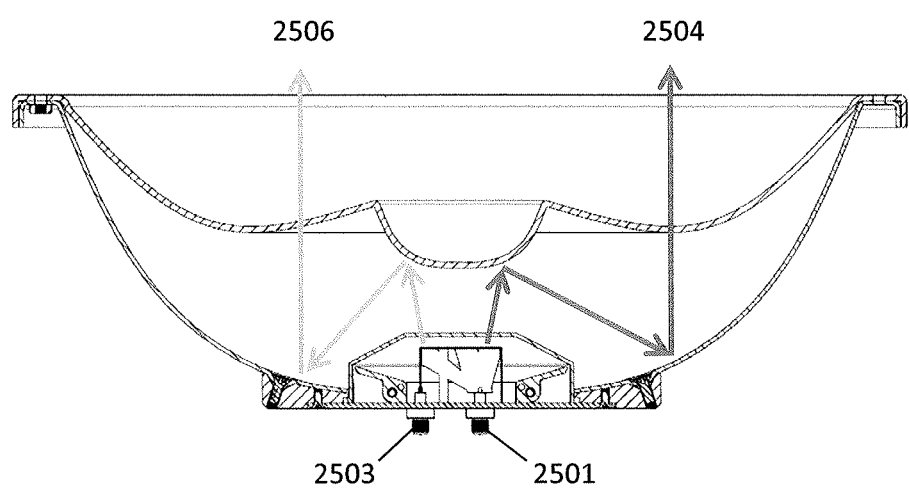
FIG. 25 is a schematic approximation of the paths taken by different RF signals beams extending from the patterned antenna radiating emitter of an antenna apparatus such as the one shown in FIGS. 23A-23G.

In FIG. 25, the two independent beams are schematically shown on a cross-section identical to the cross-section shown in FIG. 23F, illustrating transmission of two differently polarized beams from the apparatus 2504, 2505. As shown, a first RF signal may be applied (e.g., by a radio circuitry) to a first antenna input feed (via a first antenna input connector 2501). This first RF signal may be transmitted via the first antenna input feed to the emitter surface of the primary feed, where it is emitted as a first beam 2504 from a first region of the emitting/radiating surface, as shown by the arrow extending from the right side of the primary feed. This first beam is reflected by the convex secondary reflector opposite the primary feed, to the parabolic wall of the primary reflector, as shown by the arrows, and then emitted in a directional beam from the apparatus. A similar process may occur with each beams formed by RF signals from each of the other antenna input feeds, such as the beam 2506 emitted in response to an applied RF signal from a second antenna input connector 2503. In this example, the resulting beam for the RF signal emitted by the emitter/radiator surface of the primary feed is centered at a different portion of the emitter surface. Thus, the beam is reflected from a different region (sector) of the secondary reflector and primary reflector. Because of the arrangement of the inner (secondary) reflector, primary feed, and the primary reflector, both beams (and indeed all of the beams emitted by the primary feed exit the apparatus in approximately the same direction. Because of the shaped radome, the RF signals emitted may also have an approximately uniform phase front when leaving the apparatus.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A multi-focal-point antenna device having a single emitter adapted to emit three or more independent beams, the device comprising:
    a primary feed comprising a patterned antenna radiating emitter, wherein the patterned antenna radiating emitter comprises a sheet of metal having a plurality of cut-out regions along one or more edges of the patterned antenna radiating emitter;
    n antenna input feeds, where n is 3 or more, separately extending to the patterned antenna radiating emitter of the primary feed, wherein each of the n antenna input feeds are independent and electrically isolated from each other; and
    a radio circuitry coupled to each of the n antenna input feeds, wherein the radio circuitry is configured to transmit radio frequency (RF) signals to each of the n antenna input feeds transmits at a different polarization, wherein the patterned antenna radiating emitter emits n beams from the primary feed in which each of the n beams is differently polarized, and wherein the beams do not couple with each other.

2. The device of claim 1, further comprising a primary reflector having n wedge-shaped surface regions, each of the n surface regions reflecting one or the n emitted beams.

3. The device of claim 2, further comprising a secondary reflector having n wedge-shaped surface regions, each of the n surface regions reflecting one of the n emitted beams to one of the n surface regions of the primary reflector.

4. The device of claim 1, wherein n is 3, and wherein each of the emitted beams is 120 degrees off from each other.

5. The device of claim 1, wherein the patterned antenna radiating emitter has a generally triangular shape.

6. The device of claim 1, wherein the patterned antenna radiating emitter is flat.

7. The device of claim 1, wherein the patterned antenna radiating emitter comprises a flat central surface with one or more edges folded down away from a central plane of the patterned antenna radiating emitter.

8. The device of claim 1, wherein the n antenna input feeds are directly coupled to n edge regions of the patterned antenna radiating emitter.

9. The device of claim 1, wherein the patterned antenna radiating emitter comprises a single sheet of metal.

10. The device of claim 1, wherein the patterned antenna radiating emitter is sized to operate in both a 5 GHz and a 2 GHz regime.

11. The device of claim 1, wherein the patterned antenna radiating emitter comprises an emitting surface having an average diameter of between about 5 cm and 12 cm.

12. The device of claim 1, wherein the radio circuitry is configured to transmit radio frequency (RF) signals so that each of the n antenna input feeds transmits at a different polarization, spectral signal and/or delay.

13. The device of claim 1, wherein the cut-out regions of the patterned antenna radiating emitter are configured to form the n beams, wherein each beam corresponds to one of the antenna input feeds.

14. A multi-focal-point antenna device having a single emitter adapted to emit three or more independent beams for use as a multiple input, multiple output (MIMO) antenna, the device comprising:
- a base plate;
- a primary feed comprising a patterned antenna radiating emitter positioned above the base plate, wherein the patterned antenna radiating emitter comprises a single sheet of metal having a plurality of cut-out regions along one or more outer edges of the patterned antenna radiating emitter;
- n antenna input feeds, where n is 3 or more, extending through the base plate to the patterned antenna radiating emitter of the primary feed, wherein each of the n antenna input feeds are independent and electrically isolated from each other; and
- a radio circuitry coupled to each of the n antenna input feeds, wherein the radio circuitry is configured to transmit radio frequency (RF) signals so that each of the n antenna input feeds transmits at a different polarization, spectral signal and/or delay, wherein the patterned antenna radiating emitter emits n independent and uncoupled beams.

15. The device of claim 14, further comprising a primary reflector having n wedge-shaped surface regions, each of the n surface regions reflecting one or the n emitted beams.

16. The device of claim 15, further comprising a secondary reflector having n wedge-shaped surface regions, each of the n surface regions reflecting one of the n emitted beams to one of the n surface regions of the primary reflector.

17. The device of claim 14, wherein the patterned antenna radiating emitter comprises an emitting surface having an average diameter of between about 5 cm and 12 cm.

18. An antenna device having a single primary feed adapted to emit three independent beams, the device comprising:
- a primary feed comprising a patterned antenna radiating emitter, wherein the patterned antenna radiating emitter comprises a sheet of metal having a plurality of cut-out regions along one or more outer edges;
- three antenna input feeds each separately extending to the patterned antenna radiating emitter, wherein each of the three antenna input feeds are independent and electrically isolated from each other; and
- a radio circuitry coupled to each of the three antenna input feeds, wherein the radio circuitry is configured to transmit radio frequency (RF) signals so that each of the three antenna input feeds transmits at a different polarization, wherein the patterned antenna radiating emitter emits three independent and uncoupled beams.

19. The device of claim 18, wherein the three antenna input feeds are directly coupled to three edge regions of the patterned antenna radiating emitter.

20. The device of claim 18, wherein the radio circuitry is configured to transmit radio frequency (RF) signals so that each of the three antenna input feeds transmits at a different polarization, spectral signal and/or delay.

* * * * *